(12) United States Patent
Northrup et al.

(10) Patent No.: US 10,030,937 B2
(45) Date of Patent: Jul. 24, 2018

(54) SYSTEM AND METHOD FOR MARKSMANSHIP TRAINING

(71) Applicant: Shooting Simulator, LLC, Yantis, TX (US)

(72) Inventors: James L. Northrup, Dallas, TX (US); Robert P. Northrup, Dallas, TX (US); Peter F. Blakeley, Yantis, TX (US)

(73) Assignee: Shooting Simulator, LLC, Yantis, TX (US)

( * ) Notice: Subject to any disclaimer, the term of this patent is extended or adjusted under 35 U.S.C. 154(b) by 438 days.

(21) Appl. No.: 14/686,398

(22) Filed: Apr. 14, 2015

(65) Prior Publication Data
US 2015/0276349 A1 Oct. 1, 2015

Related U.S. Application Data

(63) Continuation-in-part of application No. 14/149,418, filed on Jan. 7, 2014, now Pat. No. 9,261,332, which
(Continued)

(51) Int. Cl.
| | |
|---|---|
| *F41G 3/26* | (2006.01) |
| *F41A 33/00* | (2006.01) |
| *G06F 3/01* | (2006.01) |

(52) U.S. Cl.
CPC ............ *F41G 3/2633* (2013.01); *F41A 33/00* (2013.01); *F41G 3/26* (2013.01); *F41G 3/2655* (2013.01); *G06F 3/011* (2013.01)

(58) Field of Classification Search
CPC .......... F41A 33/00; F41A 33/02; F41A 33/04; F41A 33/06; F41G 3/26; F41G 3/2605;
(Continued)

(56) References Cited

U.S. PATENT DOCUMENTS

| | | | | |
|---|---|---|---|---|
| 2,023,497 A | * | 12/1935 | Webb | ...................... F41A 33/02 125/901 |
| 3,748,751 A | | 7/1973 | Breglia et al. | |

(Continued)

FOREIGN PATENT DOCUMENTS

| | | |
|---|---|---|
| EP | 1218687 | 7/2003 |
| EP | 0944809 | 10/2003 |

(Continued)

OTHER PUBLICATIONS

Control VR, "The Future of Virtual Reality, Animation & more", video, (undated), https://www.youtube.com/watch?v=UCIUkL24oMc.
(Continued)

*Primary Examiner* — Timothy A Musselman
(74) *Attorney, Agent, or Firm* — Schultz & Associates, P.C.

(57) ABSTRACT

A system and method for simulating lead of a target includes a network, a simulation administrator and a user device connected to the network, a database connected to the simulation administrator, and a set of position trackers positioned at a simulator site. The user device includes a virtual reality unit and a computer connected to the set of virtual reality unit and to the network. A generated target is simulated. The target and the user are tracked to generate a phantom target and a phantom halo. The phantom target and the phantom halo are displayed on the virtual reality unit at a lead distance and a drop distance from the target as viewed through the virtual reality unit.

32 Claims, 21 Drawing Sheets

Related U.S. Application Data is a continuation-in-part of application No. 13/890,997, filed on May 9, 2013, now Pat. No. 9,267,762.

(58) Field of Classification Search
CPC .... F41G 3/2611; F41G 3/2616; F41G 3/2622; F41G 3/2627; F41G 3/2633; F41G 3/2638; F41G 3/2644; F41G 3/265; F41G 3/2655; F41G 3/2661; F41G 3/2666; F41G 3/2672; F41G 3/2677; F41G 3/2683; F41G 3/2688; F41G 3/2694
See application file for complete search history.

(56) References Cited

U.S. PATENT DOCUMENTS

| | | | |
|---|---|---|---|
| 3,811,204 | A | 5/1974 | Marshall et al. |
| 3,904,204 | A | 9/1975 | Yokol |
| 3,945,133 | A | 3/1976 | Mohon et al. |
| 3,995,376 | A | 12/1976 | Kimble et al. |
| 4,079,525 | A | 3/1978 | Linton et al. |
| 4,102,059 | A | 7/1978 | Kimble et al. |
| 4,223,454 | A | 9/1980 | Mohon et al. |
| 4,317,651 | A | 3/1982 | Marshall et al. |
| 4,457,715 | A | 6/1984 | Knight et al. |
| 4,583,950 | A | 4/1986 | Schroeder |
| 4,824,374 | A | 4/1989 | Hendry et al. |
| 5,194,006 | A | 3/1993 | Zaenglien, Jr. |
| 5,591,032 | A | 1/1997 | Powell et al. |
| 5,641,288 | A | 6/1997 | Zaenglein, Jr. |
| 5,991,043 | A | 11/1999 | Andersson et al. |
| 6,322,365 | B1 | 11/2001 | Shechter et al. |
| 6,780,014 | B1 | 8/2004 | Hull et al. |
| 6,942,486 | B2 | 9/2005 | Lvovskiy |
| RE38,877 | E | 11/2005 | Trabut |
| 6,997,716 | B2 | 2/2006 | Skala et al. |
| 7,188,444 | B2 | 3/2007 | Danner et al. |
| 7,329,127 | B2 | 2/2008 | Kendir et al. |
| 7,810,273 | B2 | 10/2010 | Koch et al. |
| 8,016,594 | B2 | 9/2011 | Ferris et al. |
| 8,267,691 | B1 | 9/2012 | Ferris et al. |
| 8,646,201 | B2 | 2/2014 | Hughes et al. |
| 8,734,156 | B2 | 5/2014 | Uhr |
| 8,827,706 | B2 | 9/2014 | Hogan, Jr. |
| 8,926,444 | B2 | 1/2015 | Kato et al. |
| 8,944,940 | B2 | 2/2015 | Mettler |
| 9,200,870 | B1* | 12/2015 | Theel .............. F41J 11/00 |
| 2002/0012898 | A1 | 1/2002 | Shechter et al. |
| 2003/0109298 | A1 | 6/2003 | Oishi et al. |
| 2004/0031184 | A1 | 2/2004 | Hope |
| 2006/0158910 | A1 | 7/2006 | Hunt et al. |
| 2007/0032318 | A1 | 2/2007 | Nishimura et al. |
| 2007/0254266 | A1 | 11/2007 | Galanis et al. |
| 2008/0108021 | A1* | 5/2008 | Slayton ............ A63F 13/04 434/16 |
| 2009/0155747 | A1 | 6/2009 | Cornett et al. |
| 2009/0325699 | A1 | 12/2009 | Delgiannidis |
| 2010/0141225 | A1 | 6/2010 | Isham et al. |
| 2010/0173686 | A1* | 7/2010 | Grant ............... A63F 13/06 463/2 |
| 2010/0201620 | A1 | 8/2010 | Sargent |
| 2011/0111374 | A1* | 5/2011 | Charles ........... F41A 33/02 434/19 |
| 2011/0207089 | A1 | 8/2011 | Lagettie et al. |
| 2011/0244975 | A1 | 10/2011 | Farmer et al. |
| 2011/0283586 | A1 | 11/2011 | Scallie et al. |
| 2012/0015332 | A1 | 1/2012 | Stutz |
| 2012/0183931 | A1 | 7/2012 | Galanis et al. |
| 2012/0270186 | A1 | 10/2012 | Singh |
| 2012/0297654 | A1 | 11/2012 | Williams et al. |
| 2013/0040268 | A1 | 2/2013 | Van der Walt et al. |
| 2013/0130205 | A1* | 5/2013 | Matthews ......... F41G 3/2655 434/22 |
| 2013/0344461 | A1 | 12/2013 | Tello |
| 2014/0038136 | A1 | 2/2014 | Hamilton et al. |
| 2014/0206481 | A1 | 7/2014 | Zuger |
| 2014/0295380 | A1 | 10/2014 | Amis et al. |
| 2015/0010887 | A1 | 1/2015 | Foege |

FOREIGN PATENT DOCUMENTS

| | | |
|---|---|---|
| TW | 201241396 | 10/2012 |
| WO | 2010065124 | 6/2010 |

OTHER PUBLICATIONS

Freeze HD, "Top 5 Virtual Reality gadgets of the future", video, (undated), https://www.youtube.com/watch?v=9ypIHQhaVXU.
VirTra, "VirTra on CNN Anderson Cooper 360", video, (undated), https://vimeo.com/117621064.
Accurateshooter.com, "New Wind-Reading LIDAR LaserScope", website, (undated), www.accurateshooter.com/optics/new-wind-reading-lidar-laserscope/.
Accurateshooter.com, "SCATT Aim-Tracking IR Training System", website, (undated), http://www.accurateshooter.com/optics/scatt-aim-tracking-ir-training-system/.
Avenger Advantage, LLC, "Delta Six: The Ultimate First Person Shooter Controller", website, (undated), http://www.thedeltasix.com/.
Brewster, Signe, "Hands on with the HTC Valve Vive virtual reality headset", Gigaom, website, May 7, 2015, https://gigaom.com/2015/03/07/hands-on-with-the-htc-valve-vive-virtual-reality-headset/.
Bushnell, "Yardage Pro Riflescope", website, (undated), http://www.bushnell.com/all-products/laser-rangefinders/yardage-pro-riflescope.
Davies, Alex, "Hands-on With the HTC Vive", Tom's Hardware, website, Mar. 30, 2015, http://www.tomshardware.com/reviews/htc-vive-virtualy-reality-hands-on,4102.html.
EOTech, Inc., "EOTech Weapon Accessories", website, (undated), http://www.eotechinc.com.
Eotech, Inc. "Pro Staffer: Craig Foster", website, (undated), http://www.eotechinc.com/pro-staffer-craig-foster.
"Image Stabilization", Wikipedia, website, (undated), http://en.wikipedia.org/wiki/Image_stabilization#Digital_image_stabilization.
Tracking Point, Inc., "How It Works", website, (undated), http://tracking-point.com/how-it-works.
"US Patent Issued to Vitra Systems on Sep. 18 for Threat Fire Simulation and Training System (Arizona Inventors)", HighBeam Research, website, Sep. 19, 2012, http://www.highbeam.com/doc/1P3-2764873051.html.
Van Camp, Jeffrey, "Hands On: HTC Vive VR Headset", DigitalTrends, website, Mar. 4, 2015, http://www.digitaltrends.com/vr-headset-reviews/htc-vive-hands-on/2/.
Vanguard, "Smart gun: A test bed for the army's next-generation rifle", website, May 6, 2015, http://www.vanguardcanada.com/2015/05/06/smart-gun-a-test-bed-for-the-armys-next-generation-rifle/.
Virtra, Inc., "Firearms Training Simulators", website, (undated), http://www.virtra.com/.
Virtra, Inc., "Patent Information", website, (undated), http://www.virtra.com/patent-related/.
Wawro, Alex, "TrackingPoint's sensor-packed smart gun redefines the term 'point and shoot'", TechHive, website, Jul. 31, 2013, http://www.techhive.com/article/2045080/trackingpoints-sensor-packed-smart-gun-redefines-the-term-point-and-shoot.html.
Zant, Cal, "How Do Rangefinders Work?", Precision Rifle Blog, website, Oct. 29, 2013, http://precisionrifleblog.com/2013/10/29/how-do-rangefinders-work/.
Zant, Cal, "Rangefinder Binoculars Reviews & Field Tests: Overall Results Summary", Precision Rifle Blog, website, Dec. 3, 2013, http://precisionrifleblog.com/2013/12/03/rangefinder-binoculars-reviews-field-tests-overall-results-summary/.

\* cited by examiner

SYSTEM AND METHOD FOR MARKSMANSHIP TRAINING

CROSS REFERENCE TO RELATED APPLICATION

This application is a continuation in part of U.S. application Ser. No. 14/149,418 filed Jan. 7, 2014, which is a continuation in part of U.S. application Ser. No. 13/890,997 filed May 9, 2013. Each of the patent applications identified above is incorporated herein by reference in its entirety to provide continuity of disclosure.

FIELD OF THE INVENTION

The present invention relates to devices for teaching marksmen how to properly lead a moving target with a weapon. More particularly, the invention relates to optical projection systems to monitor and simulate trap, skeet, and sporting clay shooting.

BACKGROUND OF THE INVENTION

Marksmen typically train and hone their shooting skills by engaging in skeet, trap or sporting clay shooting at a shooting range. The objective for a marksman is to successfully hit a moving target by tracking at various distances and angles and anticipating the delay time between the shot and the impact. In order to hit the moving target, the marksman must aim the weapon ahead of and above the moving target by a distance sufficient to allow a projectile fired from the weapon sufficient time to reach the moving target. The process of aiming the weapon ahead of the moving target is known in the art as "leading the target". "Lead" is defined as the distance between the moving target and the aiming point. The correct lead distance is critical to successfully hit the moving target. Further, the correct lead distance is increasingly important as the distance of the marksman to the moving target increases, the speed of the moving target increases, and the direction of movement becomes more oblique.

FIG. 1 depicts the general dimensions of a skeet shooting range. Skeet shooting range 100 has high house 101 and low house 102 separated by distance 111. Distance 111 is about 120 feet. Station 103 is adjacent high house 101. Station 109 is adjacent low house 102. Station 110 is equidistant from high house 101 and low house 102 at distance 112. Distance 112 is about 60 feet. Station 106 is equidistant from high house 101 and low house 102 and generally perpendicular to distance 111 at distance 113. Distance 113 is 45 feet. Station 106 is distance 114 from station 103. Distance 114 is about 75 feet. Stations 104 and 105 are positioned along arc 121 between stations 103 and 106 at equal arc lengths. Each of arc lengths 122, 123, and 124 is about 27 feet. Stations 107 and 108 are positioned along arc 121 between stations 106 and 109 at equal arc lengths. Each of arc lengths 125, 126, and 127 is 26 feet, 8⅜ inches.

Target flight path 116 extends from high house 101 to marker 117. Marker 117 is positioned about 130 feet from high house 101 along target flight path 115. Target flight path 115 extends from low house 102 to marker 118. Marker 118 is about 130 feet from low house 102 along target flight path 116. Target flight paths 115 and 116 intersect at target crossing point 119. Target crossing point 119 is positioned distance 120 from station 110 and is 15 feet above the ground. Distance 120 is 18 feet. Clay targets are launched from high house 101 and low house 102 along target flight paths 115 and 116, respectively. Marksman 128 positioned at any of stations 103, 104, 105, 106, 107, 108, 109, and 110 attempts to shoot and break the launched clay targets.

FIG. 2 depicts the general dimensions of a trap shooting range. Trap shooting range 200 comprises firing lanes 201 and trap house 202. Stations 203, 204, 205, 206, and 207 are positioned along radius 214 from center 218 of trap house 202. Radius 214 is distance 216 from center 218. Distance 216 is 48 feet. Each of stations 203, 204, 205, 206, and 207 is positioned at radius 214 at equal arc lengths. Arc length 213 is 9 feet. Stations 208, 209, 210, 211, and 212 are positioned along radius 215 from center 218. Radius 215 is distance 217 from center 218. Distance 217 is 81 feet. Each of stations 208, 209, 210, 211, and 212 is positioned at radius 215 at equal arc lengths. Arc length 227 is 12 feet. Field 226 has length 221 from center 218 along center line 220 of trap house 202 to point 219. Length 221 is 150 feet. Boundary line 222 extends 150 feet from center 218 at angle 224 from center line 220. Boundary line 223 extends 150 feet from center 218 at angle 225 from center line 220. Angles 224 and 225 are each 22° from center line 220. Trap house 202 launches clay targets at various trajectories within field 226. Marksman 228 positioned at any of stations 203, 204, 205, 206, 207, 208, 209, 210, 211, and 212 attempts to shoot and break the launched clay targets.

FIGS. 3A, 3B, 3C, and 3D depict examples of target paths and associated projectile paths illustrating the wide range of lead distances and distances required of the marksman. The term "projectile," as used in this application, means any projectile fired from a weapon but more typically a shotgun round comprised of pellets of various sizes. For example, FIG. 3A shows a left to right trajectory 303 of target 301 and left to right intercept trajectory 304 for projectile 302. In this example, the intercept path is oblique, requiring the lead to be a greater distance along the positive X axis. FIG. 3B shows a left to right trajectory 307 of target 305 and intercept trajectory 308 for projectile 306. In this example, the intercept path is acute, requiring the lead to be a lesser distance in the positive X direction. FIG. 3C shows a right to left trajectory 311 of target 309 and intercepting trajectory 312 for projectile 310. In this example, the intercept path is oblique and requires a greater lead in the negative X direction. FIG. 3D shows a proximal to distal and right to left trajectory 315 of target 313 and intercept trajectory 316 for projectile 314. In this example, the intercept path is acute and requires a lesser lead in the negative X direction.

FIGS. 4A and 4B depict a range of paths of a clay target and an associated intercept projectile. The most typical projectile used in skeet and trap shooting is a shotgun round, such as a 12 gauge round or a 20 gauge round. When fired, the pellets of the round spread out into a "shot string" having a generally circular cross-section. The cross-section increases as the flight time of the pellets increases. Referring to FIG. 4A, clay target 401 moves along path 402. Shot string 403 intercepts target 401. Path 402 is an ideal path, in that no variables are considered that may alter path 402 of clay target 401 once clay target 401 is launched.

Referring to FIG. 4B, path range 404 depicts a range of potential flight paths for a clay target after being released on a shooting range. The flight path of the clay target is affected by several variables. Variables include mass, wind, drag, lift force, altitude, humidity, and temperature, resulting in a range of probable flight paths, path range 404. Path range 404 has upper limit 405 and lower limit 406. Path range 404 from launch angle θ is extrapolated using:

$$x = x_o + v_{xo}t + \frac{1}{2}a_x t^2 + C_x \quad \text{Eq. 1}$$

$$y = y_o + v_{yo}t + \frac{1}{2}a_y t^2 + C_y \quad \text{Eq. 2}$$

where x is the clay position along the x-axis, $x_o$ is the initial position of the clay target along the x-axis, $v_{xo}$ is the initial velocity along the x-axis, $a_x$ is the acceleration along the x-axis, t is time, and $C_x$ is the drag and lift variable along the x-axis, y is the clay position along the y-axis, $y_o$ is the initial position of the clay target along the y-axis, $v_{yo}$ is the initial velocity along the y-axis, $a_y$ is the acceleration along the y-axis, t is time, and $C_y$ is the drag and lift variable along the x-axis. Upper limit 405 is a maximum distance along the x-axis with $C_x$ at a maximum and a maximum along the y-axis with $C_y$ at a maximum. Lower limit 406 is a minimum distance along the x-axis with $C_x$ at a minimum and a minimum along the y-axis with $C_y$ at a minimum. Drag and lift are given by:

$$F_{drag} = \frac{1}{2}\rho v^2 C_D A \quad \text{Eq. 3}$$

where $F_{drag}$ is the drag force, $\rho$ is the density of the air, $v$ is $v_o$, A is the cross-sectional area, and $C_D$ is the drag coefficient;

$$F_{lift} = \frac{1}{2}\rho v^2 C_L A \quad \text{Eq. 4}$$

where $F_{lift}$ is the lift force, $\rho$ is the density of the air, $v$ is $v_o$, A is the planform area, and $C_L$ is the lift coefficient.

Referring to FIG. 5, an example of lead from the perspective of the marksman is described. Marksman 501 aims weapon 502 at clay target 503 moving along path 504 left to right. In order to hit target 503, marksman 501 must anticipate the time delay for a projectile fired from weapon 502 to intercept clay target 503 by aiming weapon 502 ahead of clay target 503 at aim point 505. Aim point 505 is lead distance 506 ahead of clay target 503 along path 504. Marksman 501 must anticipate and adjust aim point 505 according to a best guess at the anticipated path of the target.

Clay target 503 has initial trajectory angles γ and β, positional coordinates $x_1$, $y_1$ and a velocity $v_1$. Aim point 505 has coordinates $x_2$, $y_2$. Lead distance 506 has x-component 507 and y-component 508. X-component 507 and y-component 508 are calculated by:

$$\Delta x = x_2 - x_1 \quad \text{Eq. 5}$$

$$\Delta y = y_2 - y_1 \quad \text{Eq. 6}$$

where Δx is x component 507 and Δy is y component 508. As γ increases, Δy must increase. As γ increases, Δx must increase. As β increases, Δy must increase.

The prior art has attempted to address the problems of teaching proper lead distance with limited success. For example, U.S. Pat. No. 3,748,751 to Breglia et al. discloses a laser, automatic fire weapon simulator. The simulator includes a display screen, a projector for projecting a motion picture on the display screen. A housing attaches to the barrel of the weapon. A camera with a narrow band-pass filter positioned to view the display screen detects and records the laser light and the target shown on the display screen. However, the simulator requires the marksman to aim at an invisible object, thereby making the learning process of leading a target difficult and time-consuming.

U.S. Pat. No. 3,940,204 to Yokoi discloses a clay shooting simulation system. The system includes a screen, a first projector providing a visible mark on the screen, a second projector providing an infrared mark on the screen, a mirror adapted to reflect the visible mark and the infrared mark to the screen, and a mechanical apparatus for moving the mirror in three dimensions to move the two marks on the screen such that the infrared mark leads the visible mark to simulate a lead-sighting point in actual clay shooting. A light receiver receives the reflected infrared light. However, the system in Yokoi requires a complex mechanical device to project and move the target on the screen, which leads to frequent failure and increased maintenance.

U.S. Pat. No. 3,945,133 to Mohon et al. discloses a weapons training simulator utilizing polarized light. The simulator includes a screen and a projector projecting a two-layer film. The two-layer film is formed of a normal film and a polarized film. The normal film shows a background scene with a target with non-polarized light. The polarized film shows a leading target with polarized light. The polarized film is layered on top of the normal non-polarized film. A polarized light sensor is mounted on the barrel of a gun. However, the weapons training simulator requires two cameras and two types of film to produce the two-layered film making the simulator expensive and time-consuming to build and operate.

U.S. Pat. No. 5,194,006 to Zaenglein, Jr. discloses a shooting simulator. The simulator includes a screen, a projector for displaying a moving target image on the screen, and a weapon connected to the projector. When a marksman pulls the trigger a beam of infrared light is emitted from the weapon. A delay is introduced between the time the trigger is pulled and the beam is emitted. An infrared light sensor detects the beam of infrared light. However, the training device in Zaenglein, Jr. requires the marksman to aim at an invisible object, thereby making the learning process of leading a target difficult and time-consuming.

U.S. Patent Publication No. 2010/0201620 to Sargent discloses a firearm training system for moving targets. The system includes a firearm, two cameras mounted on the firearm, a processor, and a display. The two cameras capture a set of stereo images of the moving target along the moving target's path when the trigger is pulled. However, the system requires the marksman to aim at an invisible object, thereby making the learning process of leading a target difficult and time-consuming. Further, the system requires two cameras mounted on the firearm making the firearm heavy and difficult to manipulate leading to inaccurate aiming and firing by the marksman when firing live ammunition without the mounted cameras.

The prior art fails to disclose or suggest a system and method for simulating a lead for a moving target using generated images of targets projected at the same scale as viewed in the field and a phantom target positioned ahead of the targets having a variable contrast. The prior art further fails to disclose or suggest a system and method for simulating lead in a virtual reality system. Therefore, there is a need in the art for a shooting simulator that recreates moving targets at the same visual scale as seen in the field with a phantom target to teach proper lead of a moving target in a virtual reality platform.

SUMMARY

A system and method for simulating lead of a target includes a network, a simulation administrator connected to the network, a database connected to the simulation administrator, and a user device connected to the network. The user device includes a set of virtual reality unit, and a computer connected to the virtual reality unit and to the network. A set of position trackers are connected to the computer.

In a preferred embodiment, a target is simulated. In one embodiment, a simulated weapon is provided. In another embodiment, a set of sensors is attached to a real weapon. In another embodiment, a set of gloves having a set of sensors is worn by a user. The system generates a simulated target and displays the simulated target upon launch of the generated target. The computer tracks the position of the generated target and the position of the virtual reality unit and the weapon to generate a phantom target and a phantom halo. The generated phantom target and the generated phantom halo are displayed on the virtual reality unit at a lead distance and a drop distance from the live target as viewed through the virtual reality unit. The computer determines a hit or a miss of the generated target using the weapon, the phantom target, and the phantom halo. In one embodiment, the disclosed system and method is implemented in a two-dimensional video game.

The present disclosure provides a system which embodies significantly more than an abstract idea including technical advancements in the field of data processing and a transformation of data which is directly related to real world objects and situations. The disclosed embodiments create and transform imagery in hardware, for example, a weapon peripheral and a sensor attachment to a real weapon.

BRIEF DESCRIPTION OF THE DRAWINGS

The disclosed embodiments will be described with reference to the accompanying drawings.

DETAILED DESCRIPTION

Figure 1:
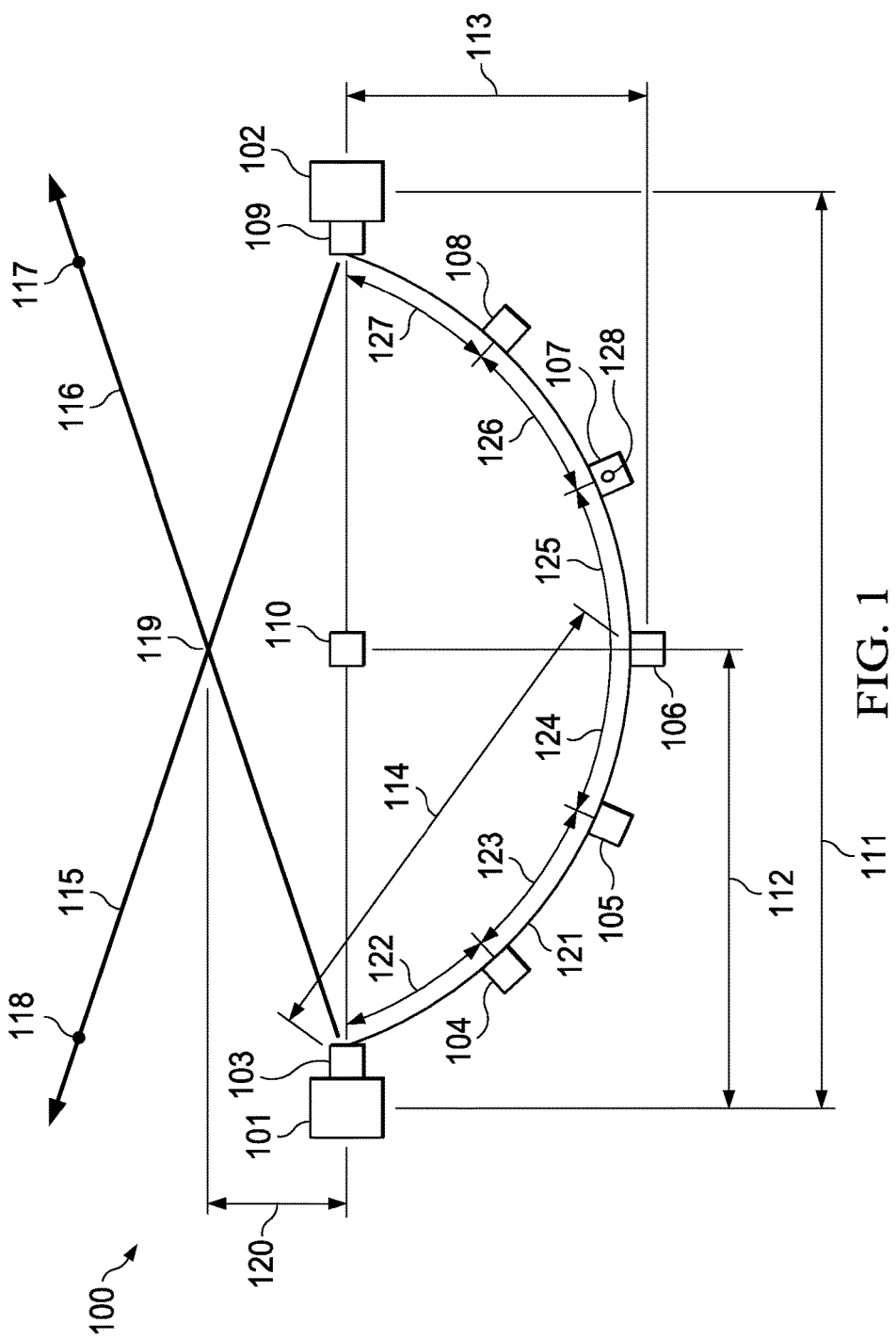
FIG. 1 is a plan view of a skeet shooting range.
Figure 2:
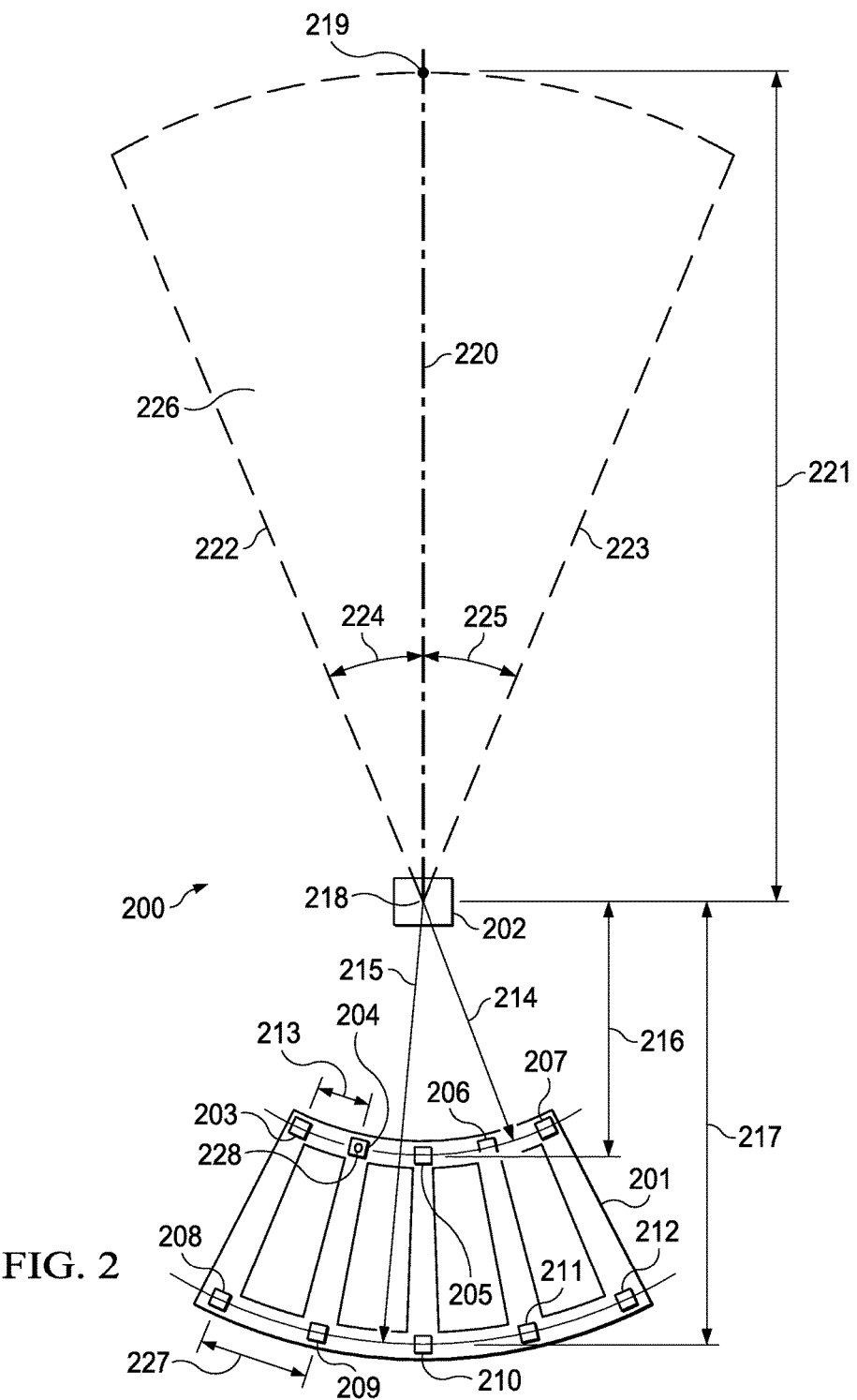
FIG. 2 is a plan view of a trap shooting range.
Figure 3A:
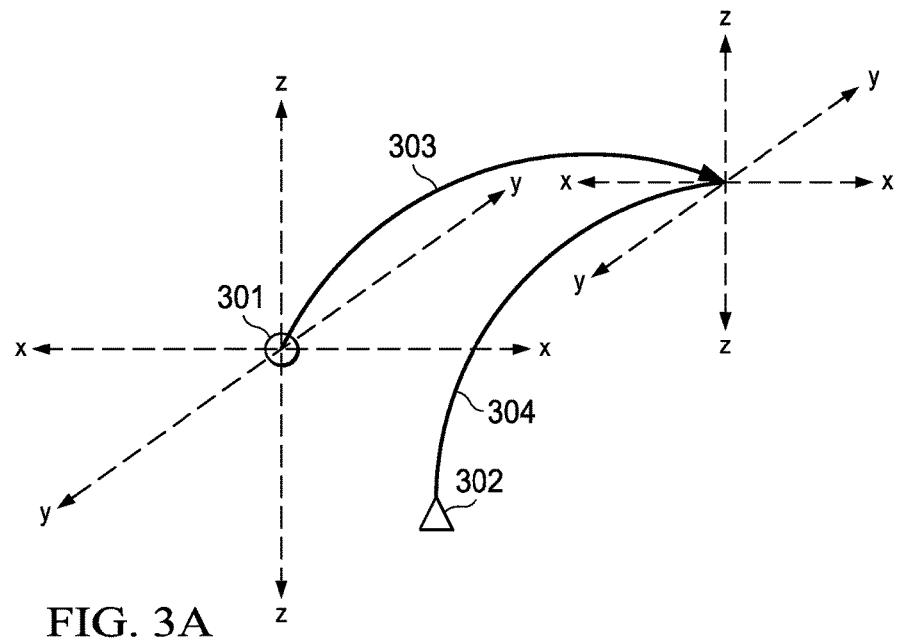
FIG. 3A is a target path and an associated projectile path.
Figure 3B:
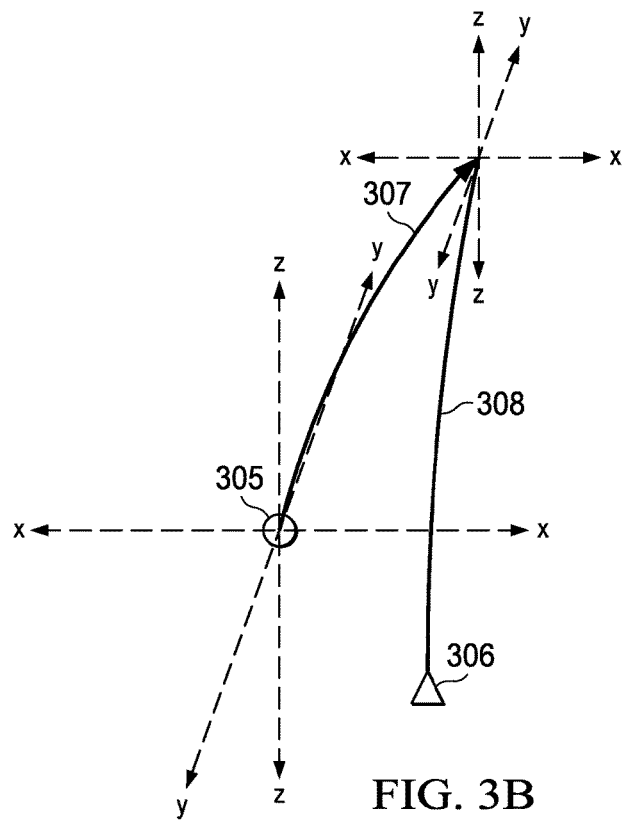
FIG. 3B is a target path and an associated projectile path.
Figure 3C:
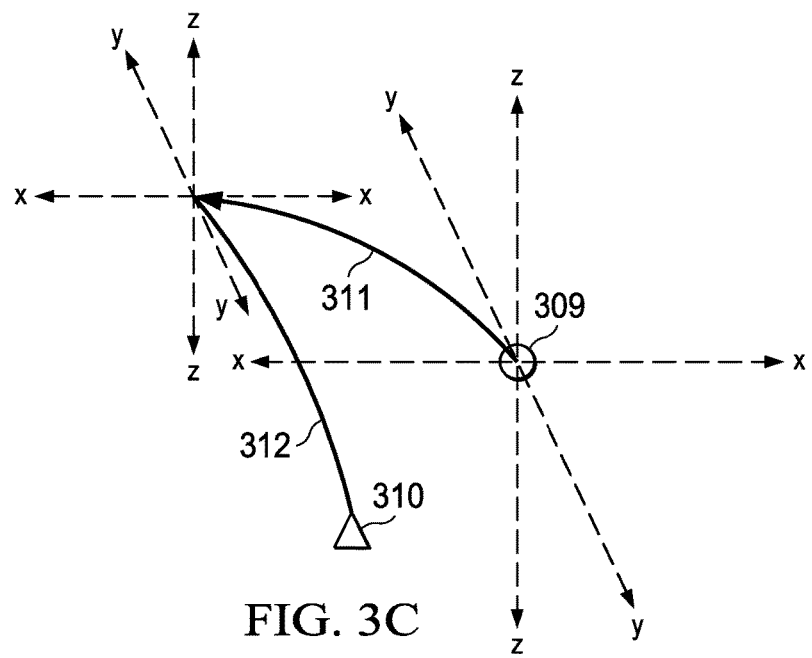
FIG. 3C is a target path and an associated projectile path.
Figure 3D:
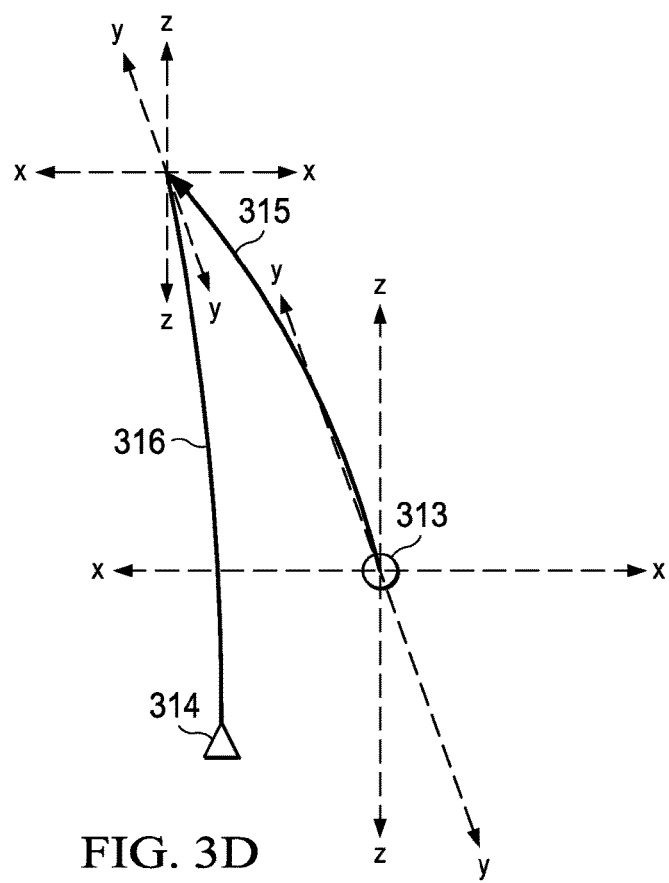
FIG. 3D is a target path and an associated projectile path.
Figure 4A:
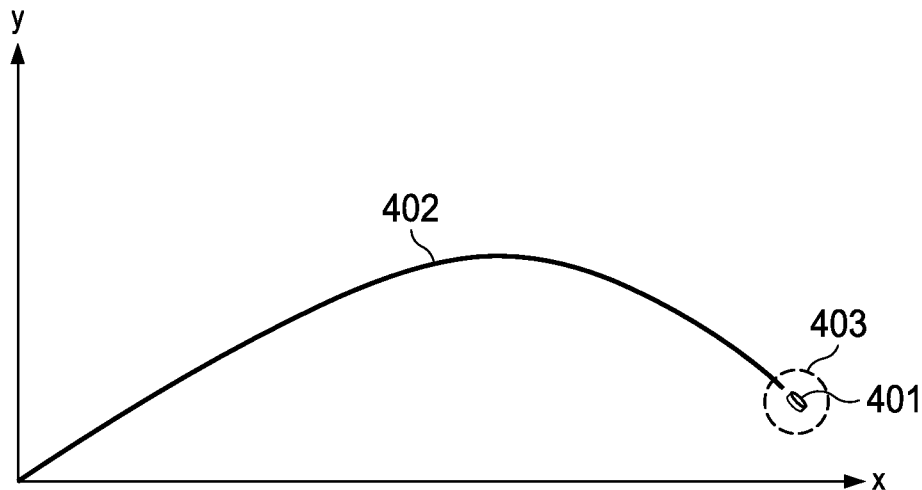
FIG. 4A is an ideal path of a moving target.
Figure 4B:
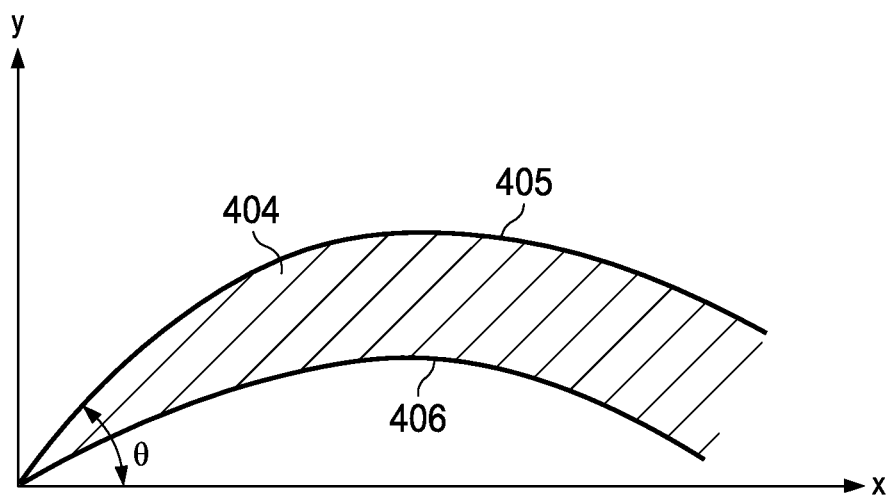
FIG. 4B is a range of probable flight paths of a target.
Figure 5:
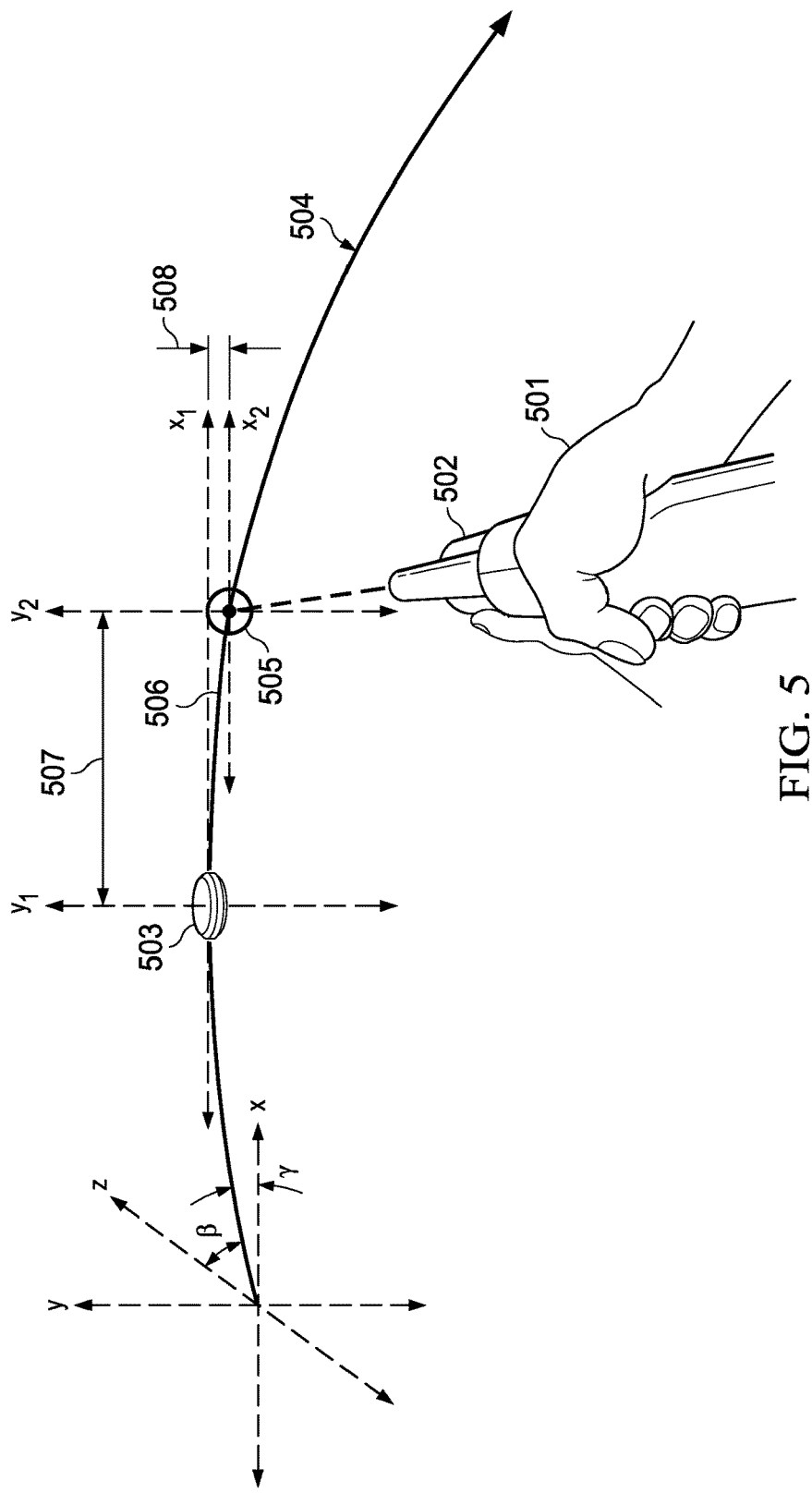
FIG. 5 is a perspective view of a marksman aiming at a moving target.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Aspects of the present disclosure are described with reference to flowchart illustrations and/or block diagrams of methods, systems and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 6:
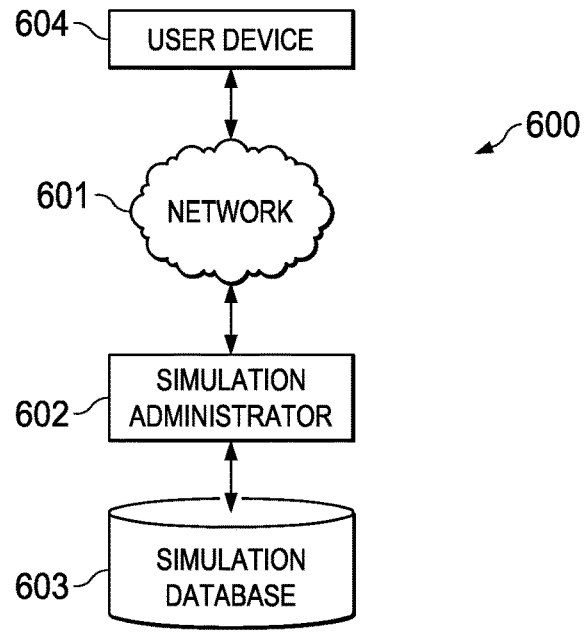
FIG. 6 is a schematic of a simulator system of a preferred embodiment.

Referring to FIG. 6, system 600 includes network 601, simulation administrator 602 connected to network 601, and user device 604 connected to network 601. System administrator 602 is further connected to simulation database 603 for storage of relevant data. For example, data includes a set of target data, a set of weapon data, and a set of environment data.

In one embodiment, network 601 is a local area network. In another embodiment, network 601 is a wide area network, such as the internet. In other embodiments, network 601 includes a combination of wide area networks and local area networks, includes cellular networks.

In a preferred embodiment, user device 604 communicates with simulation administrator 602 to access database 603 to generate and project a simulation that includes a target, a phantom, and a phantom halo adjacent to the target as will be further described below.

In another embodiment, simulation administrator 602 generates a simulation that includes a target, a phantom, a phantom halo adjacent to the target, and a weapon image as will be further described below and sends the simulation to user device for projection.

Figure 7:
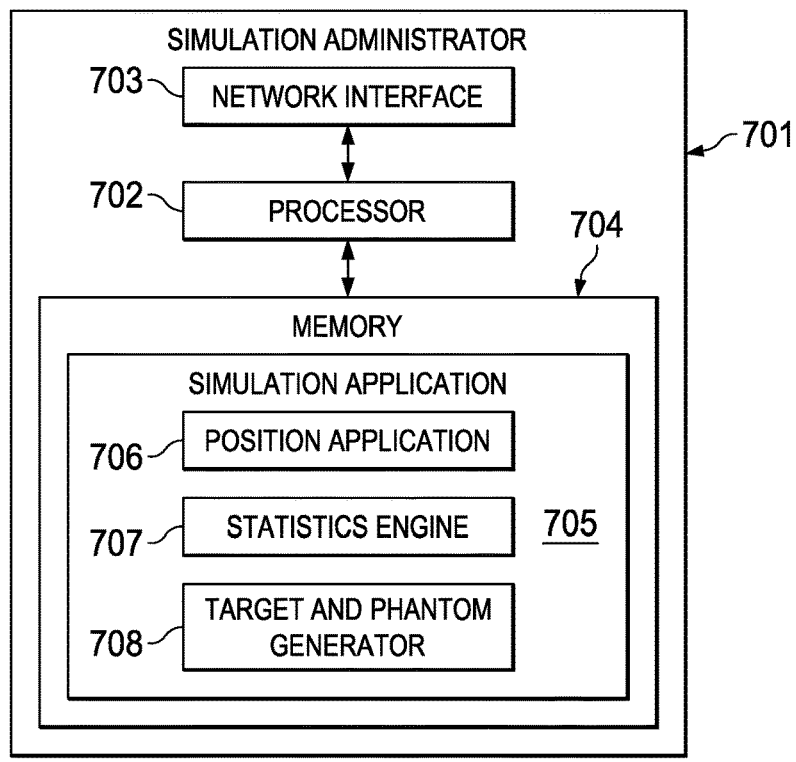
FIG. 7 is a schematic of a simulation administrator of a preferred embodiment.

Referring to FIG. 7, simulation administrator 701 includes processor 702, network interface 703 connected to processor 702, and memory 704 connected to processor 702. Simulation application 705 is stored in memory 704 and executed by processor 702. Simulation application 705 includes position application 706, statistics engine 707, and target and phantom generator 708.

In a preferred embodiment, simulation administrator 701 is a PowerEdge C6100 server and includes a PowerEdge C410x PCIe Expansion Chassis available from Dell Inc. Other suitable servers, server arrangements, and computing devices known in the art may be employed.

In one embodiment, position application 706 communicates with a position tracker connected to the user device to detect the position of the user device for simulation application 705. Statistics engine 707 communicates with a database to retrieve relevant data and generate renderings according desired simulation criteria, such as desired weapons, environments, and target types for simulation application 705. Target and phantom generator 708 calculates and generates a target along a target path, a phantom target, and a phantom halo for the desired target along a phantom path for simulation application, as will be further described below.

Figure 8:
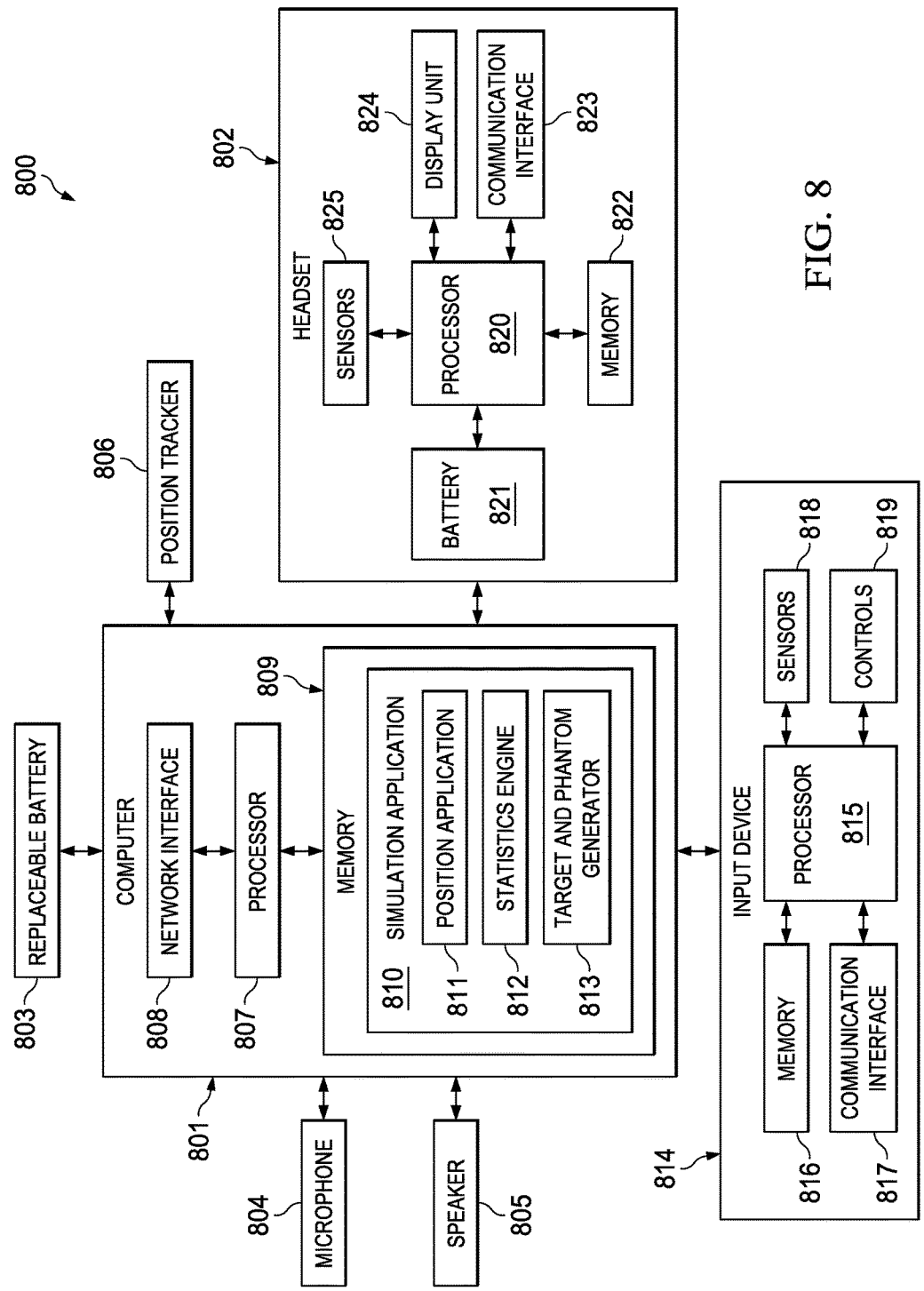
FIG. 8 is a schematic of a user device of a simulator system of a preferred embodiment.

Referring to FIG. 8, user device 800 includes computer 801 connected to headset 802. Computer 801 is further connected to replaceable battery 803, microphone 804, speaker 805, and position tracker 806.

Computer 801 includes processor 807, memory 809 connected to processor 807, and network interface 808 connected to processor 807. Simulation application 810 is stored in memory 809 and executed by processor 807. Simulation application 810 includes position application 811, statistics engine 812, and target and phantom generator 813. In a preferred embodiment, position application 811 communicates with position tracker 806 to detect the position of headset 802 for simulation application 810. Statistics engine 812 communicates with a database to retrieve relevant data and generate renderings according desired simulation criteria, such as desired weapons, environments, and target types for simulation application 810. Target and phantom generator 813 calculates and generates a target along a target path, a phantom target, and a phantom halo for the desired target along a phantom path for simulation application 810, as will be further described below.

Input device 814 is connected to computer 801. Input device 814 includes processor 815, memory 816 connected to processor 815, communication interface 817 connected to processor 815, a set of sensors 818 connected to processor 816, and a set of controls 819 connected to processor 815.

In one embodiment, input device 814 is a simulated weapon, such as a shot gun, a rifle, or a handgun. In another embodiment, input device 814 is a set of sensors connected to a disabled real weapon, such as a shot gun, a rifle, or a handgun, to detect movement and actions of the real weapon. In another embodiment, input device 814 is a glove having a set of sensors worn by a user to detect positions and movements of a hand of a user.

Headset 802 includes processor 820, battery 821 connected to processor 820, memory 822 connected to processor 820, communication interface 823 connected to processor 820, display unit 824 connected to processor 820, and a set of sensors 825 connected to processor 820.

Figure 9A:
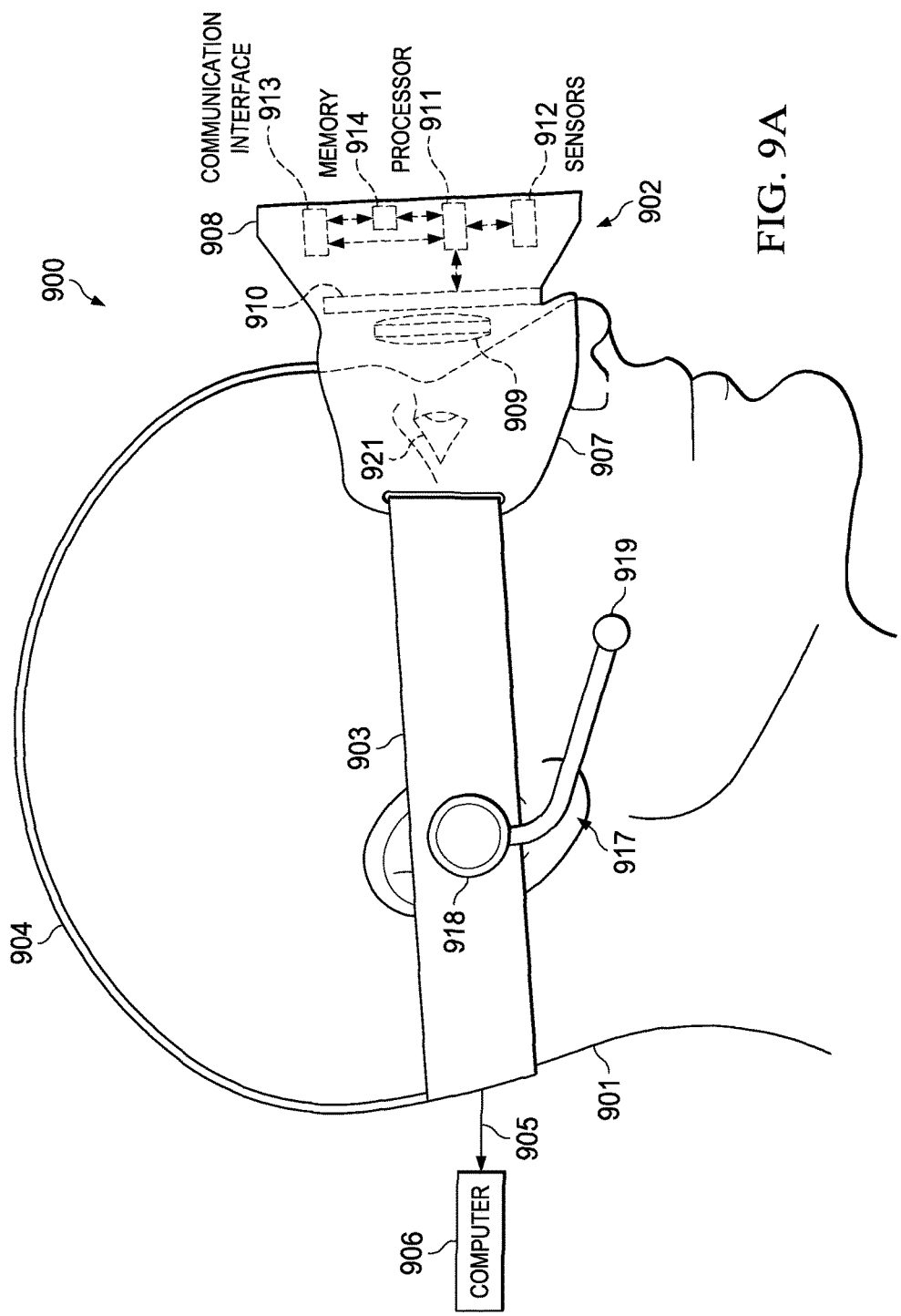
FIG. 9A is a side view of a user device of a virtual reality simulator system of a preferred embodiment.
Figure 9B:
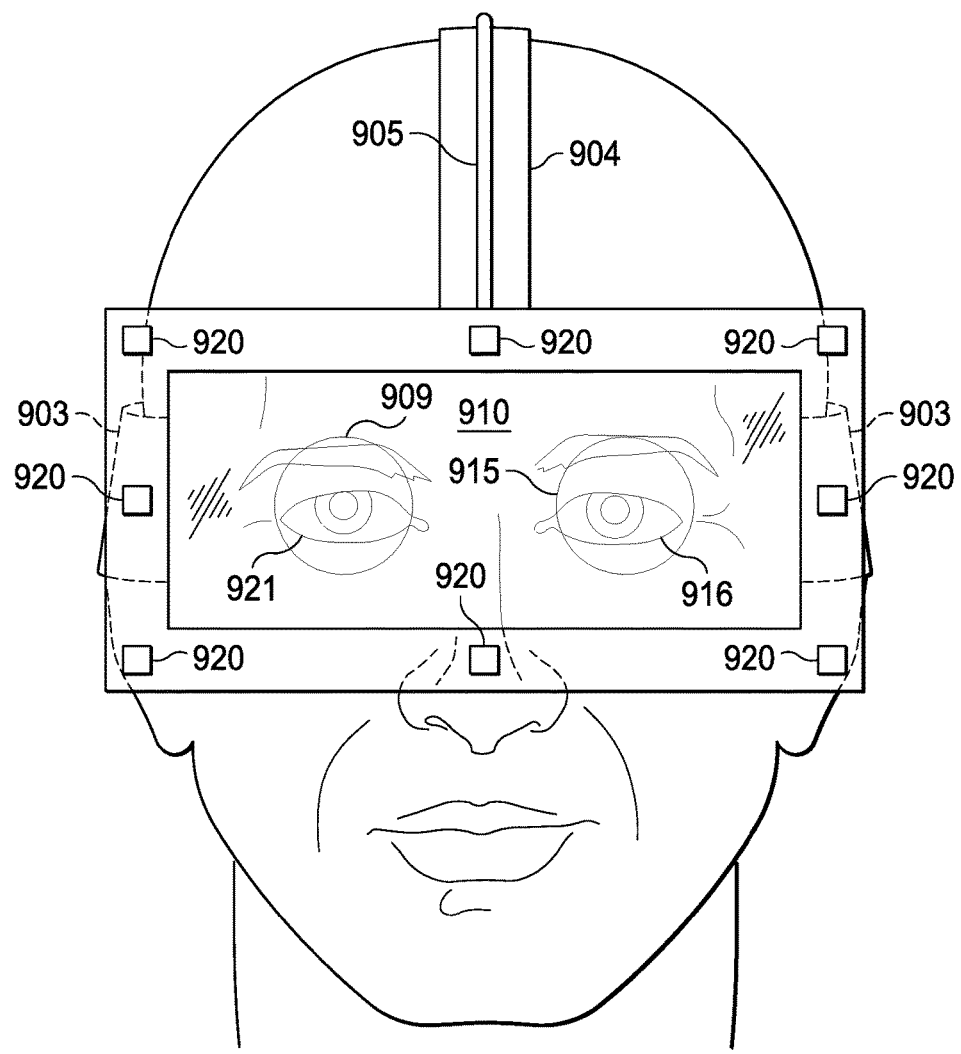
FIG. 9B is a front view of a user device of a virtual reality simulator system of a preferred embodiment.

Referring to FIGS. 9A and 9B, a preferred implementation of user device 800 is described as user device 900. User 901 wears virtual reality unit 902 having straps 903 and 904. Virtual reality unit 902 is connected to computer 906 via connection 905. Computer 906 is preferably a portable computing device, such as a laptop or tablet computer, worn by user 901. In other embodiments, computer 906 is a desktop computer or a server, not worn by the user. Any suitable computing device known in the art may be employed. Connection 905 provides a data and power connection from computer 906 to virtual reality unit 902.

Virtual reality unit 902 includes skirt 907 attached to straps 903 and 904 and display portion 908 attached to skirt 907. Skirt 907 covers eyes 921 and 916 of user 901. Display portion 908 includes processor 911, display unit 910 connected to processor 911, a set of sensors 912 connected to processor 911, communication interface 913 connected to processor 911, and memory 914 connected to processor 911. Lens 909 is positioned adjacent to display unit 910 and eye 921 of user 901. Lens 915 is positioned adjacent to display unit 910 and eye 916 of user 901. Virtual reality unit 902 provides a stereoscopic three-dimensional view of images to user 901.

User 901 wears communication device 917. Communication device 917 includes earpiece speaker 918 and microphone 919. Communication device 917 is preferably connected to computer 906 via a wireless connection such as a Bluetooth connection. In other embodiments, other wireless or wired connections are employed. Communication device 917 enables voice activation and voice control of a simulation application stored in the computer 906 by user 901.

In one embodiment, virtual reality unit 902 is the Oculus Rift headset available from Oculus VR, LLC. In another embodiment, virtual reality unit 902 is the HTC Vive headset available from HTC Corporation. In this embodiment, a set of laser position sensors 920 is attached to an external surface virtual reality unit 902 to provide position data of virtual reality unit 902. Any suitable virtual reality unit known in the art may be employed.

In a preferred embodiment, a simulation environment that includes a target is generated by computer 906. Computer 906 further generates a phantom target and a phantom halo in front of the generated target based on a generated target flight path. The simulation environment including the generated target, the phantom target, and the phantom halo are transmitted from computer 906 to virtual reality unit 902 for viewing adjacent eyes 921 and 916 of user 901, as will be further described below. The user aims a weapon at the phantom target to attempt to shoot the generated target.

Figure 10A:
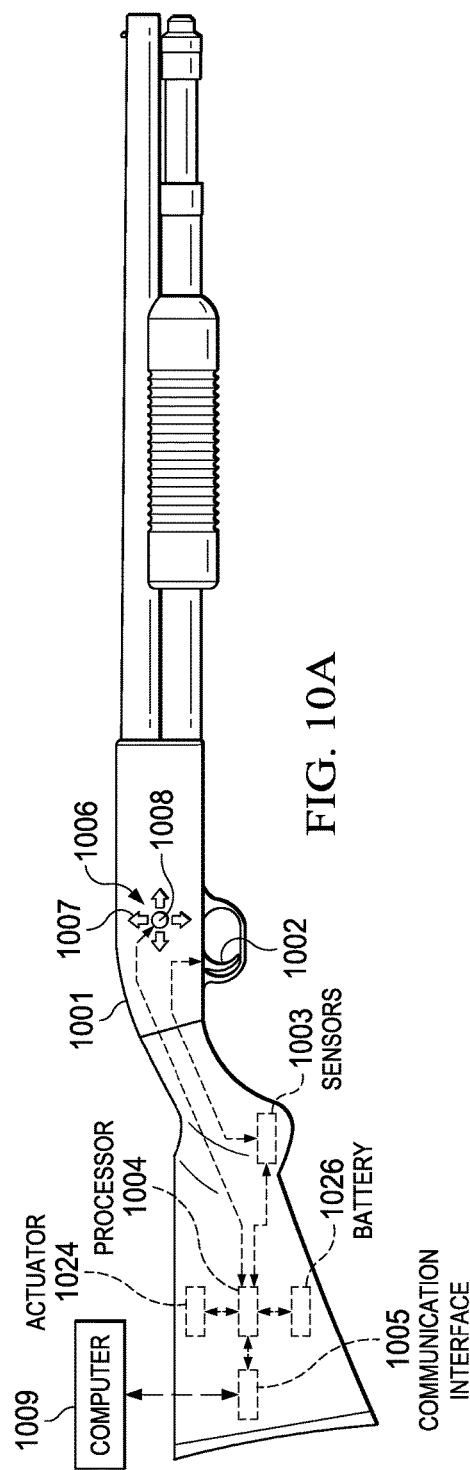
FIG. 10A is a side view of a simulated weapon for a virtual reality system of a preferred embodiment.

Referring FIG. 10A in one embodiment, simulated weapon 1001 includes trigger 1002 connected to set of sensors 1003, which is connected to processor 1004. Communication interface 1005 is connected to processor 1004 and to computer 1009. Simulated weapon 1001 further includes a set of controls 1006 attached to an external surface of weapon 1001 and connected to processor 1004. Set of controls 1006 includes directional pad 1007 and selection button 1008. Battery 1026 is connected to processor 1004. Actuator 1024 is connected to processor 1004 to provide haptic feedback.

In a preferred embodiment, simulated weapon 1001 is a shotgun. It will be appreciated by those skilled in the art that any type of weapon may be employed.

In one embodiment, simulated weapon 1001 is a Delta Six first person shooter controller available from Avenger Advantage, LLC. Other suitable simulated weapons known in the art may be employed.

In a preferred embodiment, set of sensors 1003 includes a position sensor for trigger 1002 and a set of motion sensors to detect an orientation of weapon 1001.

In a preferred embodiment, the position sensor is a Hall Effect sensor. In this embodiment, a magnet is attached to trigger 1002. Any type of Hall Effect sensor or any other suitable sensor type known in the art may be employed.

In a preferred embodiment, the set of motion sensors is a 9-axis motion tracking system-in-package package sensor, model no. MP11-9150 available from InverSense®, Inc. In this embodiment, the 9-axis sensor combines a 3-axis gyroscope, a 3-axis accelerometer, an on-board digital motion processor, and a 3-axis digital compass. In other embodiments, other suitable sensors and/or suitable combinations of sensors may be employed.

Figure 10B:
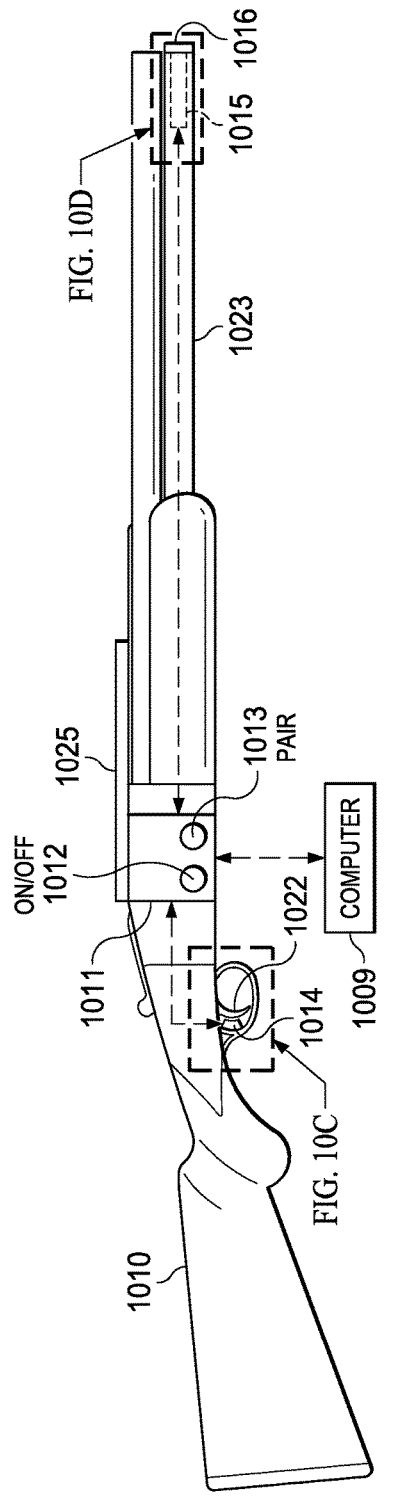
FIG. 10B is a side view of a real weapon with a set of sensors attachment for a virtual reality system of a preferred embodiment.
Figure 10C:
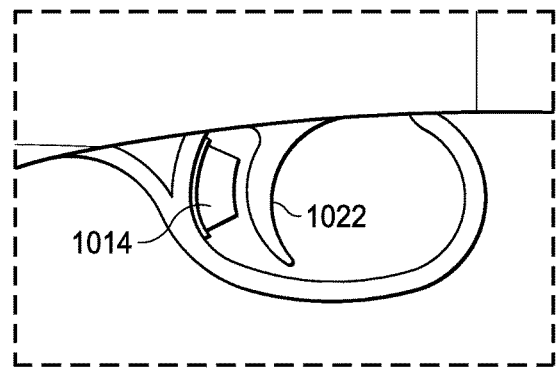
FIG. 10C is a detail view of a trigger sensor of a preferred embodiment.
Figure 10D:
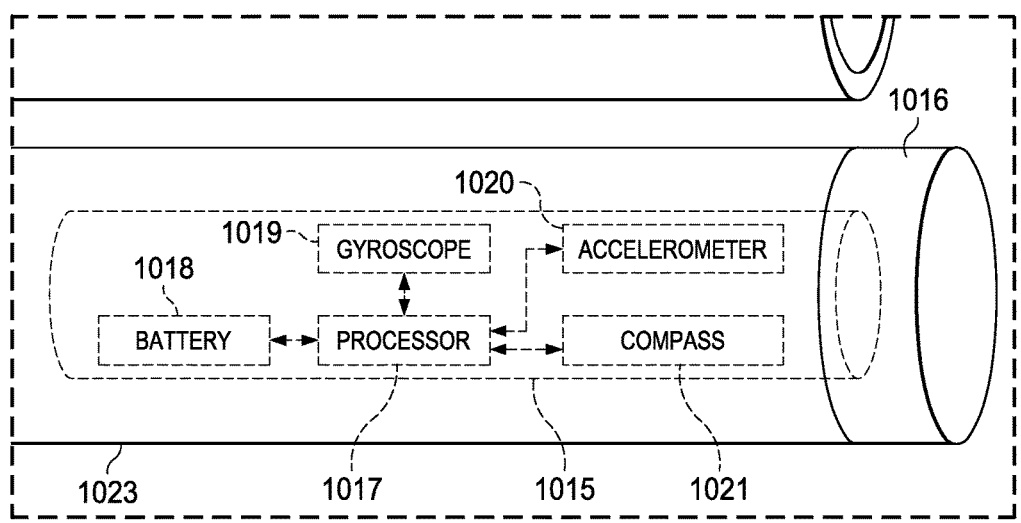
FIG. 10D is a detail view of a set of muzzle sensors of a preferred embodiment.

Referring to FIGS. 10B, 10C, and 10D in another embodiment, weapon 1010 includes simulation attachment 1011 removably attached to its stock. Simulation attachment 1011 includes on-off switch 1012 and pair button 1013 to communicate with computer 1009 via Bluetooth connection. Any suitable wireless connection may be employed. Trigger sensor 1014 is removably attached to trigger 1022 and in communication with simulation attachment 1011. A set of muzzle sensors 1015 is attached to a removable plug 1016 which is removable inserted into barrel 1023 of weapon 1010. Set of muzzle sensors 1015 include a processor 1017, battery 1018 connected to processor 1017, gyroscope 1019 connected to processor, accelerometer 1020 connected to processor 1017, and compass 1021 connected to processor 1017.

In one embodiment, set of muzzle sensors 1015 and removable plug 1016 are positioned partially protruding outside of barrel 1023 of weapon 1010.

In one embodiment, weapon 1010 includes rail 1025 attached to its stock in any position. In this embodiment, set of muzzle sensors 1015 is mounted to rail 1025.

In one embodiment, weapon 1010 fires blanks to provide kickback to a user.

It will be appreciated by those skilled in the art that any weapon may be employed as weapon 1010, including any rifle or handgun. It will be further appreciated by those skilled in the art that rail 1025 is optionally mounted to any type of weapon. Set of muzzle sensors 1025 may be mounted in any position on weapon 1010. Any type of mounting means known in the art may be employed.

Figure 11:
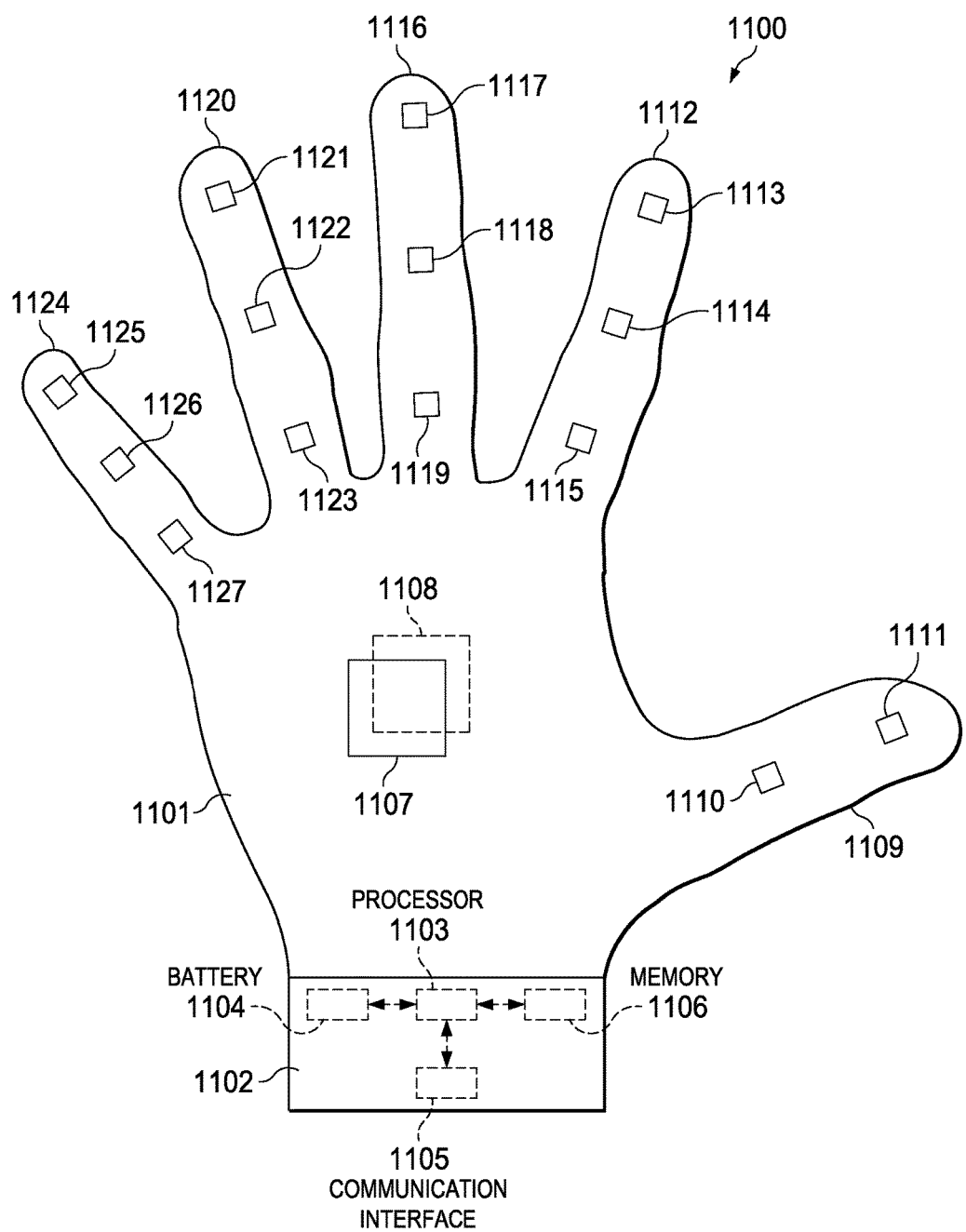
FIG. 11 is a top view of a glove controller for a virtual reality system of a preferred embodiment.

Referring to FIG. 11, tracking glove 1100 includes hand portion 1101 and wrist portion 1102. Wrist portion 1102 includes processor 1103, battery 1104 connected to processor 1103, communication interface 1105, and memory 1106 connected to processor 1103. Hand portion 1101 includes thumb portion 1109 and finger portions 1112, 1116, 1120, and 1124. Hand portion 1101 further includes backhand sensor 1107 and palm sensor 1108, each of which is connected to processor 1103. Thumb portion 1109 has sensors 1110 and 1111, each of which is connected to processor 1103. Finger portion 1112 has sensors 1113, 1114, and 1115, each of which is connected to processor 1103. Finger portion 1116 has sensors 1117, 1118, and 1119, each of which is connected to processor 1103. Finger portion 1120 has sensors 1121, 1122, and 1123, each of which is connected to processor 1103. Finger portion 1124 has sensors 1125, 1126, and 1127, each of which is connected to processor 1103.

In a preferred embodiment, hand portion 1101 is a polyester, nylon, silicone, and neoprene mixture fabric. In this embodiment, each of sensors 1110, 1111, 1113, 1114, 1115, 1117, 1118, 1119, 1121, 1122, 1123, 1125, 1126, and 1127 and each of backhand sensor 1107 and palm sensor 1108 sewn into the hand portion. Other suitable fabrics known in the art may be employed.

In a preferred embodiment, wrist portion 1102 includes a hook and loop strap to secure tracking glove 1100. Other securing means known in the art may be employed.

In a preferred embodiment, each of backhand sensor 1107 and palm sensor 1108 is a an iNEMO inertial module model no. LSM9DS1 available from ST Microelectronics. Other suitable sensors known in the art may be employed.

In a preferred embodiment, each of sensors 1110, 1111, 1113, 1114, 1115, 1117, 1118, 1119, 1121, 1122, 1123, 1125, 1126, and 1127 is an iNEMO inertial module model no. LSM9DS1 available from ST Microelectronics. Other suitable sensors known in the art may be employed.

Figure 12:
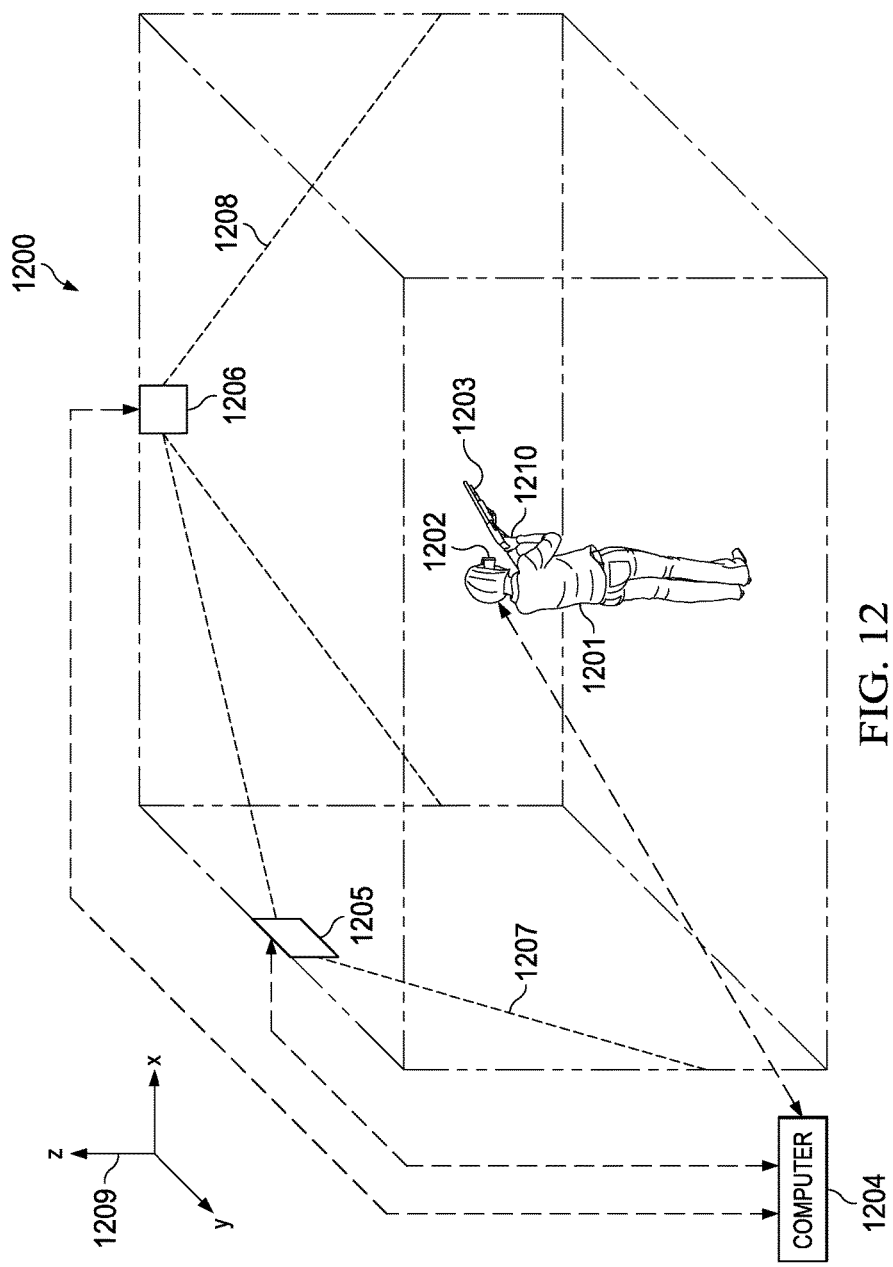
FIG. 12 is a schematic view of a virtual reality simulation environment of a preferred embodiment.

Referring to FIG. 12, in simulation environment 1200 user 1201 wears user device 1202 connected to computer 1204 and holds weapon 1203. Each of position trackers 1205 and 1206 is connected to computer 1204. Position tracker 1205 has field of view 1207. Position tracker 1206 has field of view 1208. User 1201 is positioned in fields of view 1207 and 1208.

In one embodiment, weapon 1203 is a simulated weapon. In another embodiment, weapon 1203 is a real weapon with a simulation attachment. In another embodiment, weapon 1203 is a real weapon and user 1201 wears a set of tracking gloves 1210. In other embodiments, user 1201 wears the set of tracking gloves 1210 and uses the simulated weapon or the real weapon with the simulation attachment.

In a preferred embodiment, each of position trackers 1205 and 1206 is a near infrared CMOS sensor having a refresh rate of 60 Hz. Other suitable position trackers known in the art may be employed.

In a preferred embodiment, position trackers 1205 and 1206 capture the vertical and horizontal positions of user device 1202, weapon 1203 and/or set of gloves 1210. For example, position tracker 1205 captures the positions and movement of user device 1202 and weapon 1203, and/or set of gloves 1210 in the y-z plane of coordinate system 1209 and position tracker 1206 captures the positions and movement of user device 1202 and weapon 1203 and/or set of gloves 1210 in the x-z plane of coordinate system 1209. Further, a horizontal angle and an inclination angle of the weapon are tracked by analyzing image data from position trackers 1205 and 1206. Since the horizontal angle and the inclination angle are sufficient to describe the aim point of the weapon, the aim point of the weapon is tracked in time.

In a preferred embodiment, computer 1204 generates the set of target data includes a target launch position, a target launch angle, and a target launch velocity of the generated target. Computer 1204 retrieves a set of weapon data based on a desired weapon, including a weapon type e.g., a shotgun, a rifle, or a handgun, a set of weapon dimensions, a weapon caliber or gauge, a shot type including a load, a caliber, a pellet size, and shot mass, a barrel length, a choke type, and a muzzle velocity. Other weapon data may be employed. Computer 1204 further retrieves a set of environmental data that includes temperature, amount of daylight, amount of clouds, altitude, wind velocity, wind direction, precipitation type, precipitation amount, humidity, and barometric pressure for desired environmental conditions. Other types of environmental data may be employed.

Position trackers 1205 and 1206 capture a set of position image data of user device 1202, weapon 1203 and/or set of gloves 1210 and the set of images is sent to computer 1204. Sensors in user device 1202, weapon 1203 and/or set of gloves 1210 detect a set of orientation data and sends the set of orientation data to computer 1204. Computer 1204 then calculates a generated target flight path for the generated target based on the set of target data, the set of environment data, and the position and orientation of the user device 1202. The position and orientation of the user device 1202, the weapon 1203 and/or set of gloves 1210 are determined from the set of position image data and the set of orientation data. Computer 1204 generates a phantom target and a phantom halo based on the generated target flight path and transmits the phantom target and the phantom halo to user device 1202 for viewing by user 1201. User 1201 aims weapon 1203 at the phantom target and the phantom halo to attempt to hit the generated target. Computer 1204 detects a trigger pull on weapon 1203 by a trigger sensor and/or a finger sensor and determines a hit or a miss of the generated target based on the timing of the trigger pull, the set of weapon data, the position and orientation of user device 1202, weapon 1203, and/or set of gloves 1210, the phantom target, and the phantom halo.

Figure 13:
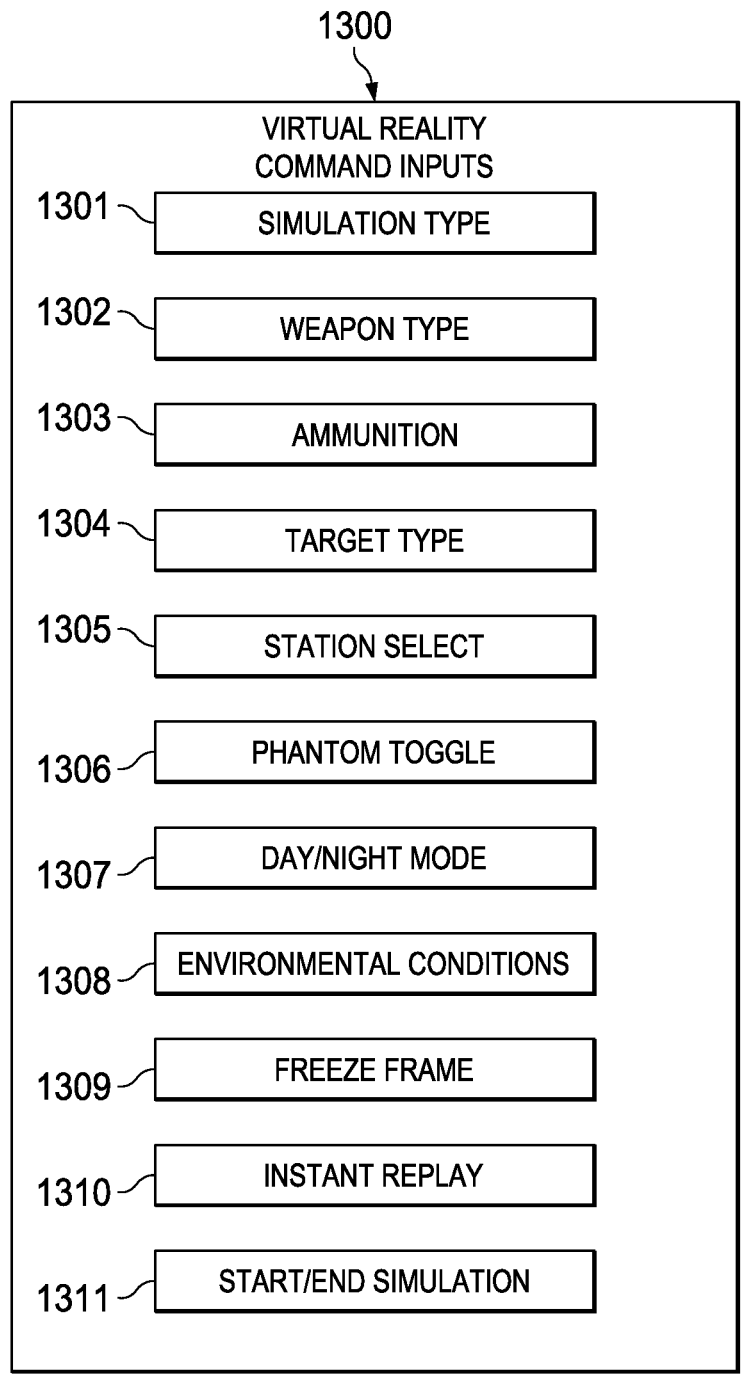
FIG. 13 is a command input menu for a virtual reality simulator system of a preferred embodiment.

Referring to FIG. 13, command menu 1300 includes simulation type 1301, weapon type 1302, ammunition 1303, target type 1304, station select 1305, phantom toggle 1306, day/night mode 1307, environmental conditions 1308, freeze frame 1309, instant replay 1310, and start/end simulation 1311. Simulation type 1301 enables a user to select different types of simulations. For example, the simulation type includes skeet shooting, trap shooting, sporting clays, and hunting. Weapon type 1302 enables the user to choose from different weapon types and sizes such as a shot gun, a rifle, and a handgun, and different calibers or gauges of the weapons type. The user further enters a weapon sensor location, for example, in the muzzle or on a rail, and whether the user is right or left handed. Ammunition 1303 enables the user to select different types of ammunition for the selected weapon type. Target type 1304 enables the user to select different types of targets for the simulation, including a target size, a target color, and a target shape. Station select 1305 enables the user to choose different stations to shoot from, for example, in a trap shooting range, a skeet shooting range, or a sporting clays course. The user further selects a number of shot sequences for the station select. In a preferred embodiment, the number of shot sequences in the set of shot sequences is determined by the type of shooting range used and the number of target flight path variations to be generated. For example, the representative number of shot sequences for a skeet shooting range is at least eight, one shot sequence per station. More than one shot per station may be utilized.

Phantom toggle 1306 allows a user to select whether to display a phantom target and a phantom halo during the simulation. The user further selects a phantom color, a phantom brightness level, and a phantom transparency level. Day/night mode 1307 enables the user to switch the environment between daytime and nighttime. Environmental conditions 1308 enables the user to select different simulation environmental conditions including temperature, amount of daylight, amount of clouds, altitude, wind velocity, wind direction, precipitation type, precipitation amount, humidity, and barometric pressure. Other types of environmental data may be employed. Freeze frame 1309 allows the user to "pause" the simulation. Instant replay 1310 enables the user replay the last shot sequence including the shot attempt by the user. Start/end simulation 1311 enables the user to start or end the simulation. In one embodiment, selection of 1301, 1302, 1303, 1304, 1305, 1306, 1307, 1308, 1309, 1310, and 1311 is accomplished via voice controls. In another embodiment, selection of 1301, 1302, 1303, 1304, 1305, 1306, 1307, 1308, 1309, 1310, and 1311 is accomplished via a set of controls on a simulated weapon as previously described.

Figure 14:
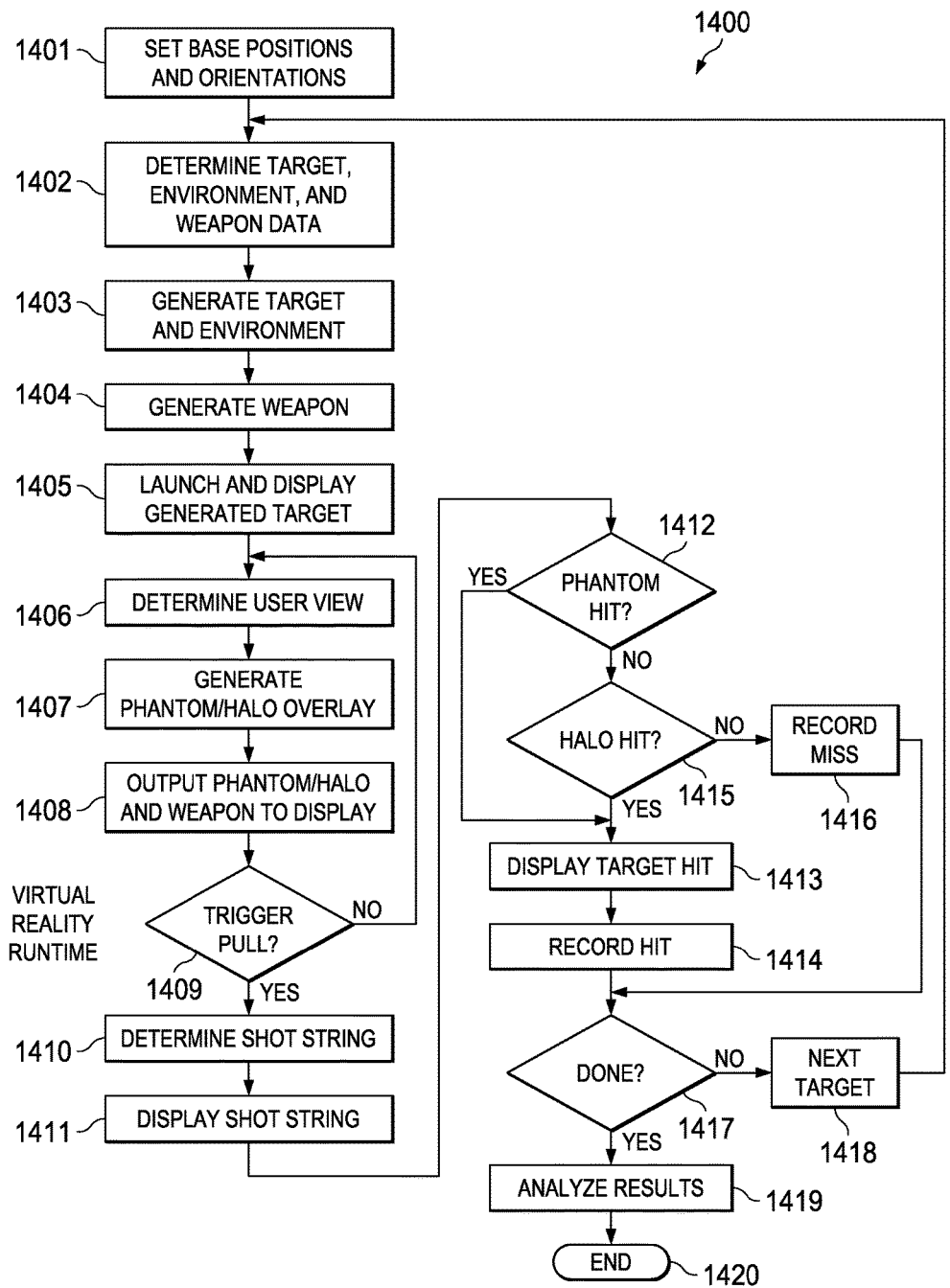
FIG. 14 is a flow chart of a method for runtime process of a virtual reality simulation system of a preferred embodiment.

Referring to FIG. 14, runtime method 1400 for a target simulation will be described. At step 1401, a baseline position and orientation of the user device and a baseline position and orientation of the weapon are set. In this step, the computer retrieves a set of position image data from a set of position trackers, a set of orientation data from a set of sensors in the user device, the weapon and/or a set of gloves and saves the current position and orientation of the user device and the weapon into memory. Based on the simulation choice, the virtual position of the launcher relative to the position and orientation of the user device is also set. If the user device is oriented toward the virtual location of the launcher, a virtual image of the launcher will be displayed. At step 1402, a set of target flight data, a set of environment data, and a set of weapon data are determined from a set of environment sensors and a database.

In a preferred embodiment, the set of weapon data is downloaded and saved into the database based on the type of weapon that is in use. In a preferred embodiment, the set of weapon data includes a weapon type e.g., a shotgun, a rifle, or a handgun, a weapon caliber or gauge, a shot type including a load, a caliber, a pellet size, and shot mass, a barrel length, a choke type, and a muzzle velocity. Other weapon data may be employed.

In a preferred embodiment, the set of environment data is retrieved from the database and includes a wind velocity, an air temperature, an altitude, a relative air humidity, and an outdoor illuminance. Other types of environmental data may be employed.

In a preferred embodiment, the set of target flight data is retrieved from the database based on the type of target in use. In a preferred embodiment, the set of target flight data includes a launch angle of the target, an initial velocity of the target, a mass of the target, a target flight time, a drag force, a lift force, a shape of the target, a color of the target, and a target brightness level.

At step 1403, the target and environment are generated from the set of target flight data and the set of environmental data. At step 1404, a virtual weapon image is generated and saved in memory. In this step, images and the set of weapon data of the selected weapon for the simulation is retrieved from the database. At step 1405, the target is launched and the target and environment are displayed in the user device. In a preferred embodiment, a marksman will initiate the launch with a voice command such as "pull".

At step 1406, a view of the user device with respect to a virtual target launched is determined, as will be further described below.

At step 1407, a phantom target and a phantom halo are generated based on a target path and the position and orientation of the user, as will be further described below. The target path is determined from the target position the target velocity using Eqs. 1-4. At step 1408, the generated phantom target and the generated phantom halo are sent to the user device and displayed, if the user device is oriented toward the target path. The generated weapon is displayed if the user device is oriented toward the position of the virtual weapon. At step 1409, whether the trigger on the weapon has been pulled is determined from a set of weapon sensors and/or a set of glove sensors. If not, then method 1400 returns to step 1406. If the trigger has been pulled, then method 1400 proceeds to step 1410.

At step 1410, a shot string is determined. In this step, a set of position trackers capture a set of weapon position images. In this step, a set of weapon position data is received from a set of weapon sensors. The shot string is calculated by:

$$A_{shot\ string} = \pi R_{string}^2 \qquad \text{Eq. 7}$$

$$R_{string} = R_{initial} + v_{spread} t \qquad \text{Eq. 8}$$

where $A_{shot\ string}$ is the area of the shot string, $R_{string}$ is the radius of the shot string, $R_{initial}$ is the radius of the shot as it leaves the weapon, $v_{spread}$ is the rate at which the shot spreads, and t is the time it takes for the shot to travel from the weapon to the target. An aim point of the weapon is determined from the set of weapon position images and the set of weapon position data. A shot string position is determined from the position of the weapon at the time of firing and the area of the shot string.

At step 1411, if the user device is oriented along the muzzle of the weapon, the shot string is displayed on the user device at the shot string position. Separately, a gunshot sound is played. At step 1412, whether the phantom target has been "hit" is determined. The simulation system determines the position of the shot string, as previously described. The simulation system compares the position of the shot string to the position of the phantom target.

If the position of the shot string overlaps the position of the phantom target, then the phantom target is "hit". If the position of the shot string does not overlap the phantom target, then the phantom target is "missed".

If the phantom target is hit and the user device is oriented toward the hit location, then method 1400 displays an animation of the target being destroyed on the user device at the appropriate coordinates and plays a sound of the target being destroyed at step 1413. At step 1414, the simulation system records a "hit" in the database.

If a "miss" is determined at step 1412, then method 1400 proceeds to step 1415. At step 1415, whether the phantom halo is hit is determined. In this step, whether the shot string overlaps an area of the phantom halo by a percentage greater than or equal to a predetermined percentage is determined. For example, the predetermined percentage is 50%. Whether the shot string overlaps at least 50% of the area of the phantom halo is determined. Any predetermined percentage may be employed.

If the position of the shot string overlaps the phantom halo by a percentage greater than or equal to the predetermined percentage, then a "hit" is determined and method 1400 proceeds to step 1413.

If at step 1415, the shot string does not overlap the area of the phantom halo by a percentage greater than or equal to the predetermined percentage, then a "miss" is determined and the simulation system records a "miss" in the database at step 1416.

At step 1417, whether an end command has been received to complete the simulation is determined. If not received, then method 1400 advances to the next target at step 1418.

If an end command has been received and the simulation is complete, then a trend of shot attempts is analyzed at step 1419 by retrieving a number of "hits" in the set of shot sequences and a number of "misses" in the set of shot sequences from the database. In this step, a shot improvement is determined by evaluating the number of hits in the set of shot sequences and the number of misses in the set of shot sequences. Method 1400 ends at step 1420.

Figure 15A:
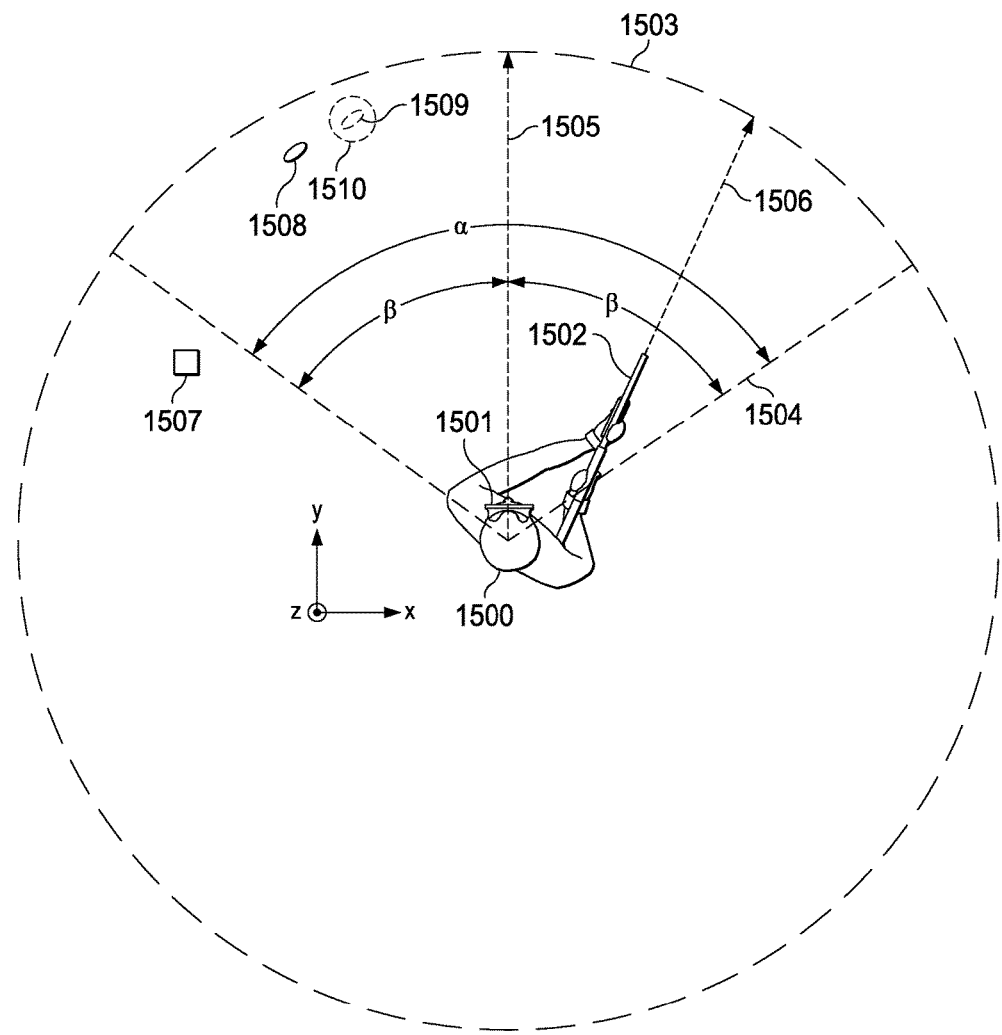
FIG. 15A is top view of a user and a simulation environment of a preferred embodiment.

Referring to FIG. 15A, user 1500 wears user device 1501 and holds weapon 1502 in simulation environment 1503. Simulation environment 1503 is a virtual sphere spanning 360° in all directions surrounding user 1500. User device 1501 has field of view 1504. Field of view 1504 is a cone that has angular range α and spans an arcuate portion (in two dimensions) or a sectorial portion (in three dimensions) of simulation environment 1503. User device orientation vector 1505 bisects field of view 1504 and angular range α into equal angles β. Weapon 1502 has weapon orientation vector 1506. Each of user device orientation vector 1505 and weapon orientation vector 1506 is independent of each other. The positions of user device 1501, weapon 1502, user device orientation vector 1505, and weapon orientation vector have Cartesian x,y,z coordinates. Simulation environment 1503 has spherical coordinates. Simulation environment 1503 includes virtual target launcher 1507, virtual target 1508, phantom target 1509 and phantom halo 1510. As can be seen, weapon 1502, virtual target 1508, phantom target 1509, and phantom halo 1510 are in field of view 1504 of user device 1501. Virtual target launcher 1507 is not in field of view 1504 of user device 1501. Weapon 1502, virtual target 1508, phantom target 1509 and phantom halo 1510 will be displayed in user device 1501 and virtual launcher 1507 will not be displayed in user device 1501.

In a preferred embodiment, angular range α is approximately 110° and each of equal angles β is approximately 55°. Other angular ranges may be employed.

Figure 15B:
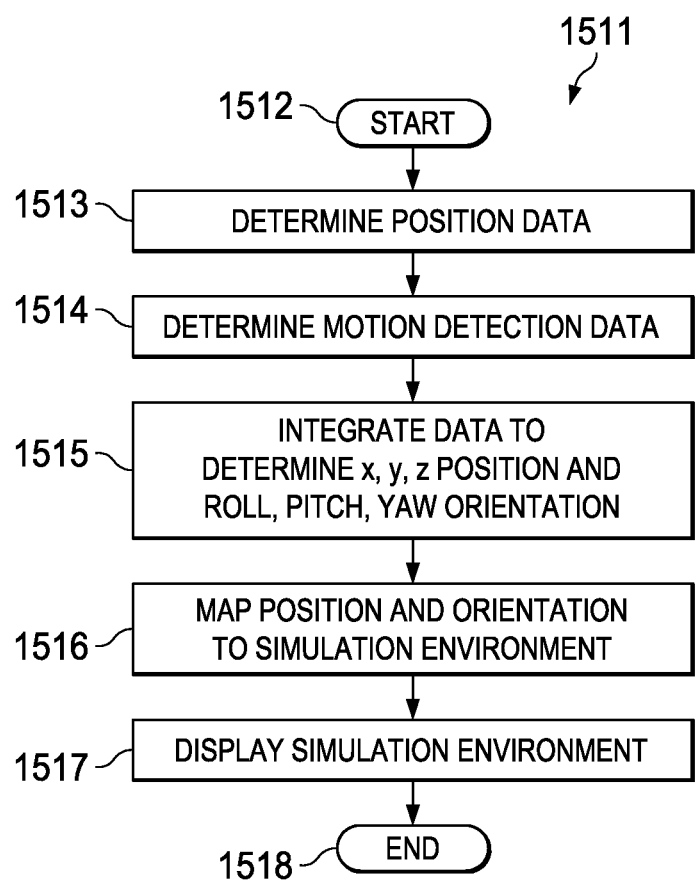
FIG. 15B is a flow chart of a method for determining a view for a user device with respect to a position and an orientation of the user device and the weapon.

Referring to FIG. 15B, step 1406 will be further described as method 1511 for determining a view for a user device with respect to a position and an orientation of the user device and the weapon. Method 1511 begins at step 1512. At step 1513, a set of current position image data is retrieved from a set of position trackers and a set of current position and orientation data is retrieved from the user device and the weapon and/or set of gloves. At step 1514, a set of motion detection data is received from a set of sensors in the user device to determine movement of the user device and from the weapon and/or set of gloves to determine movement of the weapon. At step 1515, the set of motion detection data and the position of the user device and the weapon and/or set of gloves are combined to determine an x, y, z position of the user device and the weapon and a roll, pitch, and yaw or detection of the user device and the weapon. The current x, y, z orientation vectors for the user device and the weapon are calculated from the difference between the baseline position and orientation and the current position and orientation of the user device and the weapon. The set of motion detection data received is the roll, pitch, and yaw orientation movement of the head of the user and the weapon. At step 1516, the current positions and orientation vectors of the user device and the weapon are mapped to the simulation environment. In a preferred embodiment, the current positions and orientation vectors are a 1:1 ratio to the positions and orientation vectors in the simulation environment. For example, for every inch and/or degree that the user device and/or the weapon moves and/or rotates, the view of the user and/or the simulated weapon moves one inch and/or rotates one degree in the simulated environment. Other ratios may be employed. The mapping determines the display view, as will be further described below. At step 1517, the simulation environment that would be visible the user based on the orientation of the user device and the weapon is displayed. Method 1500 ends at step 1518.

Figure 15C:
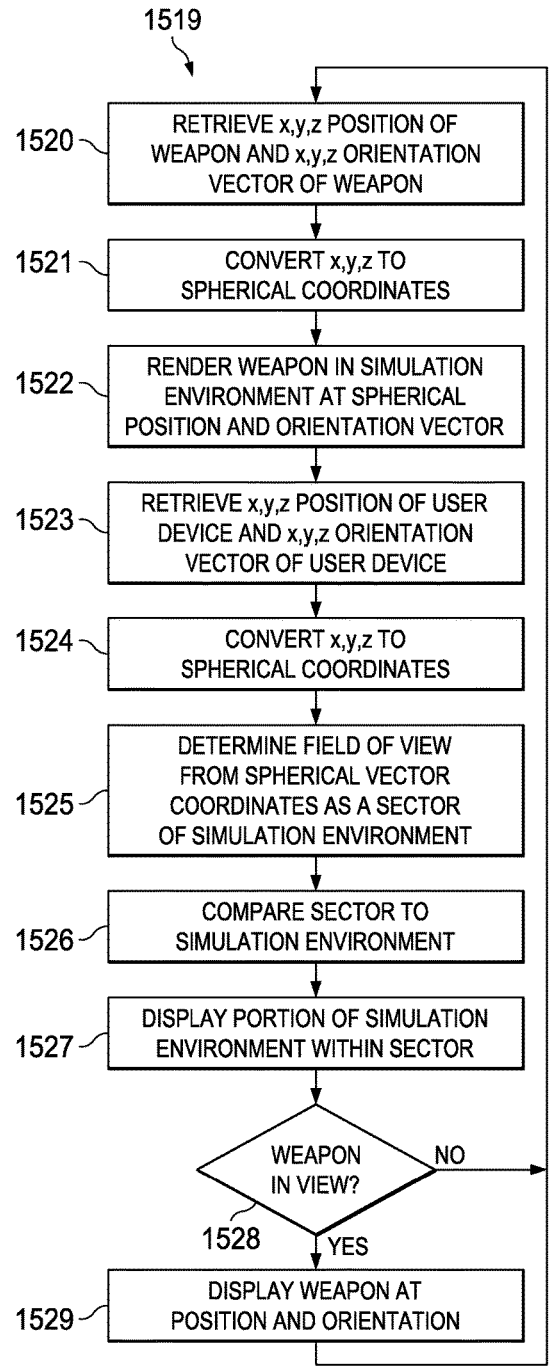
FIG. 15C is a flow chart of a method for mapping the position and orientation of the user device and the weapon to the simulation environment for determining a display field of view a preferred embodiment.

Referring to FIG. 15C, step 1516 will be further described as method 1519 for mapping the position and orientation of the user device and the weapon to the simulation environment for determining a display field of view. At step 1520, the x, y, z positions of the weapon and the weapon orientation vector are retrieved. At step 1521, the x, y, z positions of the weapon and the weapon orientation vector are converted to spherical coordinates (r, θ, φ) using:

$$r = \sqrt{x^2 + y^2 + z^2} \qquad \text{Eq. 9}$$

$$\theta = \arccos\left(\frac{x}{\sqrt{x^2 + y^2 + z^2}}\right) \qquad \text{Eq. 10}$$

$$\varphi = \arctan\left(\frac{y}{x}\right) \qquad \text{Eq. 11}$$

At step 1522, the weapon is rendered in the simulation environment at the spherical position and orientation vector. At step 1523, the x, y, z positions of the user device and the user device orientation vector are retrieved. At step 1524, the x, y, z positions of the user device and the user device orientation vector are converted to spherical coordinates (r, θ, φ) using Eqs. 9, 10, and 11. At step 1525, the display field of view is determined from the spherical orientation vector coordinates. In this step, equal angles β are measured from the user device orientation vector to define the display field of view as a sector of the simulation environment in spherical coordinates. At step 1526, the field of view sector is compared to the simulation environment to determine a portion of the simulation environment within the field of view sector. At step 1527, the portion of the simulation environment within the field of view sector is displayed on the user device as the display field of view. At step 1528, the spherical position and orientation vector of the weapon is compared to the field of view sector to determine whether the weapon is in the display field of view. If the weapon is not in the display field of view, then method 1519 returns to step 1520. If the weapon is in the display field of view, then the weapon is displayed on the user device at the spherical position and orientation. Method 1519 then returns to step 1520.

Figure 16A:
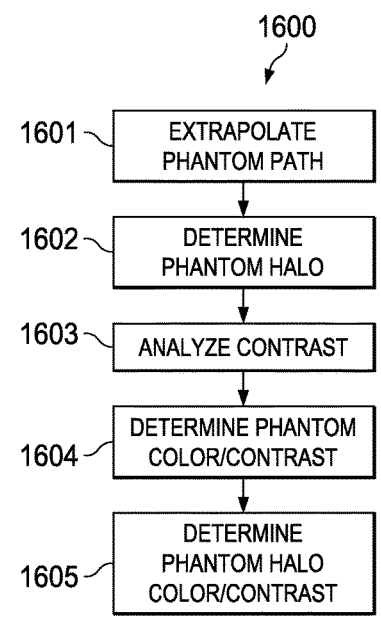
FIG. 16A is a flowchart of a method for determining a phantom and halo of a preferred embodiment.
Figure 16B:
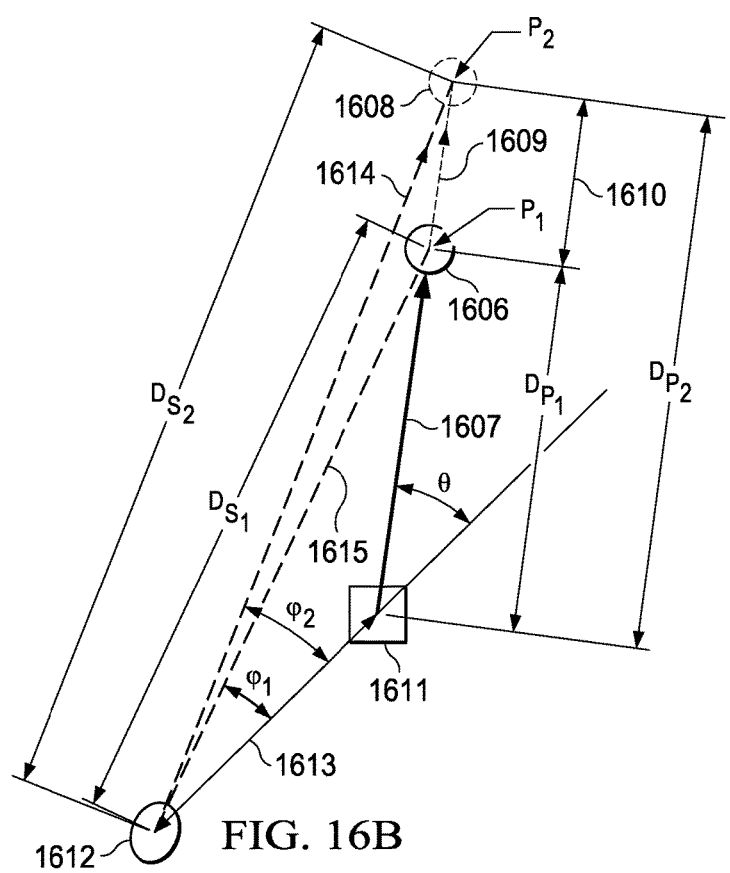
FIG. 16B is a plan view of a target and a phantom of a preferred embodiment.
Figure 16C:
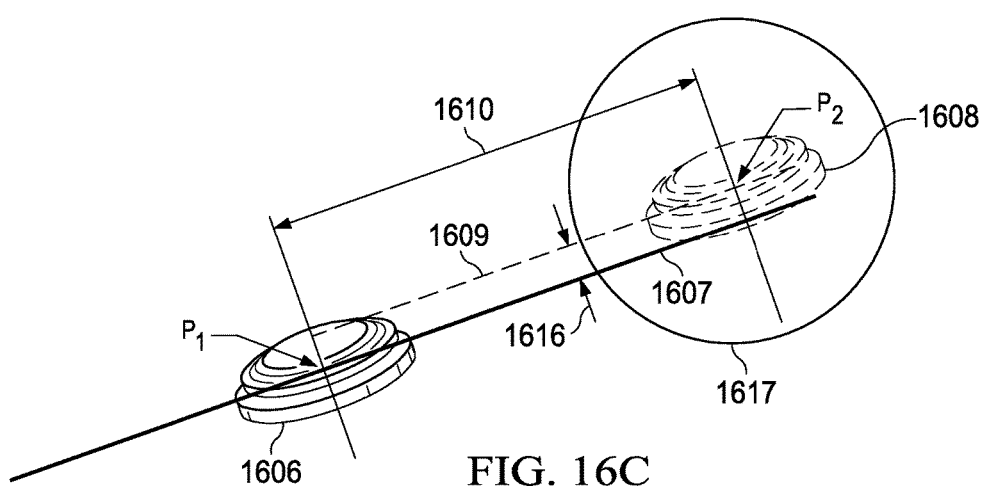
FIG. 16C is an isometric view of a target and a phantom of a preferred embodiment.

Referring to FIG. 16A, step 1407 will be further described as method 1600 for generating a phantom target and a phantom halo. At step 1601, a phantom path is extrapolated. Referring to FIGS. 16B and 16C, target 1606 is launched from launch point 1611 and moves along target path 1607 at position $P_1$. Phantom target 1608 moves along phantom path 1609 ahead of target 1606 at position $P_2$. Position $P_2$ is lead distance 1610 and drop distance 1616 from position $P_1$. Phantom path 1609 varies as target 1606 and target path 1607 varies, thereby varying lead distance 1610. Marksman 1612 is positioned at distance 1613 from launch point 1611. Marksman 1612 aims at phantom target 1608 and shoots along shot path 1614 to intercept target 1606. Target path 1607 is extrapolated over time using the set of target flight data. Target path 1607 is calculated using Eqs. 1-4.

Referring to FIG. 16B, lead distance 1610 is calculated using target path 1607, the relative marksman location, and the set of weapon data.

$$D_{P_2} \approx \frac{D_{S_2}\tan\varphi_2}{\cos\theta\tan\varphi_2 - \sin\theta} \qquad \text{Eq. 12}$$

$$D_{P_1} \approx \frac{D_{S_1}\tan\varphi_1}{\cos\theta\tan\varphi_1 - \sin\theta} \qquad \text{Eq. 13}$$

where $D_{P_2}$ is the distance of phantom target 1608 at position $P_2$ from launch point 1611, $D_{S_2}$ is the distance from marksman 1612 to phantom target 1608 along shot path 1614, $\varphi_2$ is the angle between shot path 1614 and distance 1613, $\theta$ is the launch angle between target path 1607 and distance 1613, $D_{P_1}$ is the distance of target 1606 at position $P_1$ from launch point 1611, $D_{S_1}$ is the distance from marksman 1612 to target 1606 along shot path 1615, $\varphi_1$ is the angle between shot path 1615 and distance 1613, $\theta$ is the launch angle between target path 1607 and distance 1613. Lead distance 1610 is:

$$D_{Lead} \approx D_{P_2} - D_{P_1} \qquad \text{Eq. 14}$$

$$D_{Lead} \approx \frac{A\Delta D_S \tan C\Delta\varphi}{\cos B\theta \tan C\Delta\varphi - \sin B\theta} \qquad \text{Eq. 15}$$

where $D_{Lead}$ is lead distance 1610, $\Delta D_S$ is the difference between the distances of shot paths 1614 and 1615, $\Delta\varphi$ is the difference between angles $\varphi_2$ and $\varphi_1$, $\theta$ is the launch angle between target path 1607 and distance 1613. A is a variable multiplier for shot size, gauge, and shot mass, B is a variable multiplier for $\theta$ including vibration of a target thrower and a misaligned target in the target thrower, and C is a variable multiplier for drag, lift, and wind.

For example, the approximate times it takes for a 7½ shot size shell with an initial muzzle velocity of approximately 1,225 feet per second to travel various distances is shown in Table 1.

TABLE 1

Time and Distances of a 7½ Shot

| Distance from barrel | Time (seconds) |
|---|---|
| 30 feet | 0.027 |
| 60 feet | 0.060 |
| 90 feet | 0.097 |
| 120 feet | 0.139 |
| 150 feet | 0.186 |
| 180 feet | 0.238 |

Various lead distances between target 1606 and phantom target 1608 for target 1606 having an initial velocity of approximately 30 mph is shown in Table 2.

TABLE 2

Lead Distances with a 7½ Shot on a Full Crossing Shot

| Distance from Barrel | Lead Distance |
|---|---|
| 60 feet | 2.64 feet |
| 90 feet | 4.62 feet |
| 120 feet | 5.56 feet |

Referring to FIG. 16C, phantom path 1609 is offset from target path 1607 by drop distance 1616 to simulate and compensate for the average exterior ballistics drop of a shot. The "drop of a shot" is the effect of gravity on the shot during the distance traveled by the shot. The shot trajectory has a near parabolic shape. Due to the near parabolic shape of the shot trajectory, the line of sight or horizontal sighting plane will cross the shot trajectory at two points called the near zero and far zero in the case where the shot has a trajectory with an initial angle inclined upward with respect to the sighting device horizontal plane, thereby causing a portion of the shot trajectory to appear to "rise" above the horizontal sighting plane. The distance at which the weapon is zeroed, and the vertical distance between the sighting device axis and barrel bore axis, determine the amount of the "rise" in both the X and Y axes, i.e., how far above the horizontal sighting plane the rise goes, and over what distance it lasts.

Drop distance 1616 is calculated by:

$$D_{Drop} \approx v_t \tau \ln\left[\cosh\left(\frac{t_{impact}}{\tau}\right)\right] \qquad \text{Eq. 16}$$

where $D_{Drop}$ is drop distance 1616, $t_{impact}$ is the time required for a shot string fired by marksman 1612 to impact target 1608. $T_{impact}$ is determined by a set of lookup tables having various impact times at predetermined distances for various shot strings.

$$v_t = \sqrt{\frac{2mg}{C\rho A}}, \text{ and} \qquad \text{Eq. 17}$$

$$\tau = \frac{v_t}{g} \qquad \text{Eq. 18}$$

where $v_t$ is the terminal velocity of target 1606, m is the mass of target 1606, g is the vertical acceleration due to gravity, C is the drag coefficient for target 1606, $\rho$ is the density of the air, A is the planform area of target 1606, and $\tau$ is the characteristic time.

Referring to FIGS. 16A and 16C, at step 1602, phantom halo 1617 is determined. Phantom halo 1617 is a simulation of a shot string at a distance of the phantom target from the position of the marksman. In a preferred embodiment, an area of phantom halo 1617 is determined from the set of weapon data and calculated by:

$$A_{shot\ string} = \pi R_{string}^2 \qquad \text{Eq. 19}$$

$$R_{string} = \gamma R_{initial} + v_{spread} t \qquad \text{Eq. 20}$$

$$A_{phantom\ halo} = A_{shot\ string} \qquad \text{Eq. 21}$$

where $A_{shot\ string}$ is the area of the shot string, $R_{string}$ is the radius of the shot string, $R_{initial}$ is the radius of the shot as it leaves the weapon, $\gamma$ is a variable multiplier for any choke applied to the weapon as determined from the set of weapon data, $v_{spread}$ is the rate at which the shot spreads, and t is the time it takes for the shot to travel from the weapon to the target. $A_{phantom\ halo}$ is the area of phantom halo 1617.

In one embodiment, the area of phantom halo 1617 varies as the amount of choke applied to the weapon varies.

Returning to FIG. 16A, at step 1603, a relative contrast value between the target and a background surrounding the target is analyzed by calculating the difference between a grayscale brightness of the target and an average brightness of the background surrounding the target and the difference between an average color of the target and a color of the background surrounding the target based on a desired day/night setting and a set of desired environmental conditions.

At step 1604, a color and a contrast level of a phantom target is determined. In a preferred embodiment, the phantom target includes a set of pixels set at a predetermined contrast level. The predetermined contrast level is determined by the difference of the color between the phantom target and the target and the difference of the brightness between the phantom target and the target. In this embodiment, the predetermined contrast level is a range from a fully opaque image to a fully transparent image with respect to the image of the target and the image of the background.

In a preferred embodiment, the set of pixels is set at a predetermined color. For example, blaze orange has a pixel equivalent setting of R 232, G 110, B0.

At step 1605, a color and contrast level of the phantom halo is determined. In a preferred embodiment, the phantom halo includes a set of pixels set at a predetermined contrast level. The predetermined contrast level is determined by the difference of the color between the phantom halo and the target and the difference of the brightness between the phantom halo and the target. In this embodiment, the predetermined contrast level is a range from a fully opaque image to a fully transparent image with respect to the image of the target and the image of the background.

In a preferred embodiment, the set of pixels is set at a predetermined color. For example, black has a pixel equivalent setting of R 0, G 0, B 0. Any color may be employed.

Figure 17:
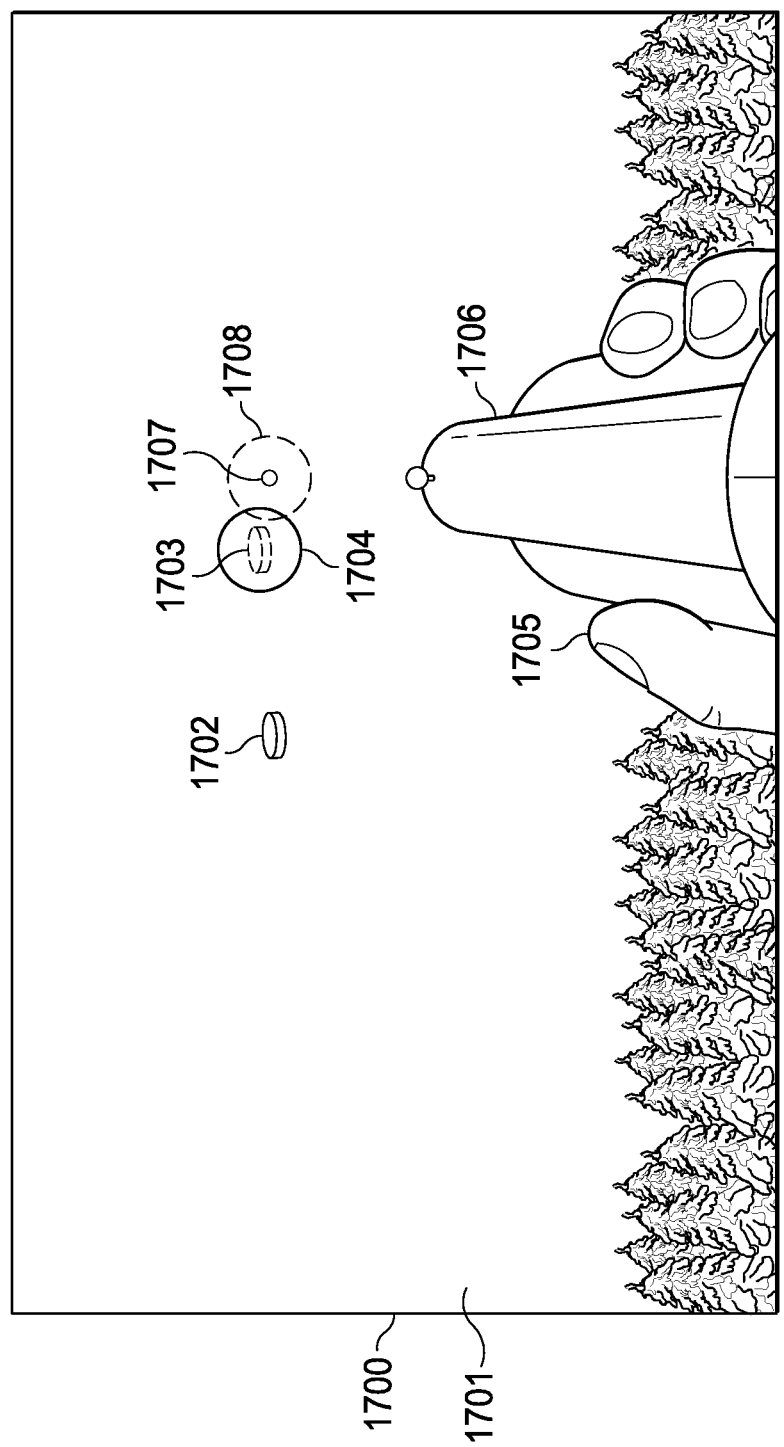
FIG. 17 is a user point of view of a virtual reality simulation system of a preferred embodiment.

Referring to FIG. 17, a view of a simulation from the perspective of a marksman wearing a user device is shown. Through display 1700, background environment 1701 and target 1702 are viewed. Phantom target 1703 is projected at a lead distance and at a drop distance from target 1702. Phantom halo 1704 is projected surrounding phantom target 1703. Marksman 1705 aims weapon 1706 at phantom target 1703.

In a preferred embodiment, shot center 1707 appears on display 1700 when marksman 1705 pulls a trigger of weapon 1706. Shot string 1708 surrounds shot center 1707. In a preferred embodiment, shot string 1708 is a simulation of a shot pellet spread fired from weapon 1706.

It will be appreciated by those skilled in the art that the described embodiments disclose significantly more than an abstract idea including technical advancements in the field of data processing and a transformation of data which is directly related to real world objects and situations in that the disclosed embodiments enable a computer to operate more efficiently. For example, the disclosed embodiments transform positions, orientations, and movements of a user device and a weapon into a graphical representations of the user and the weapon in a simulation environment.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A method for training a marksman comprising:
receiving a set of target data and a set of environment data;
generating a simulation environment from the set of environment data;
generating a target along a target path from the set of target data in the simulation environment;
extrapolating a phantom path from the target path;
calculating a lead distance from the target path;
calculating a drop distance from the target path;
calculating a phantom position along the phantom path at the lead distance and at the drop distance, in the simulation environment;
generating a phantom image at the phantom position;
determining a headset position and a headset orientation;
determining a weapon position and a weapon orientation;
generating a user view of the simulation environment based on the headset position and the headset orientation;
displaying the user view;
receiving a trigger pull signal;
determining a shot string position from the trigger pull signal, the weapon position, and the weapon orientation;
determining a phantom hit condition based on the shot string position and the phantom position; and,
generating a hit signal if the phantom hit condition is true.

2. The method of claim 1, wherein the step of generating a phantom image further comprises the step of generating the phantom image at a set of predetermined contrast levels.

3. The method of claim 1 further comprising:
calculating a halo position along the phantom path, at the lead distance and at the drop distance, in the simulation environment;
generating a halo image at the halo position;
determining a halo hit condition based on the shot string position and the halo position; and,
generating the hit signal if the halo hit condition is true.

4. The method of claim 3, further comprising the step of setting a base headset position, a base weapon position, a base headset orientation, and a base weapon orientation.

5. The method of claim 4, further comprising the steps of:
receiving a set of hand position data;
determining the weapon position from the set of hand position data and the base weapon position;
determining the weapon orientation from the set of hand position data and the base weapon orientation; and,
generating the trigger pull signal from the set of hand position data.

6. The method of claim 3, further comprising the steps of:
receiving a set of headset position data;
receiving a set of weapon position data;
determining the headset position from the set of headset position data and the base headset position; and,
determining the weapon position from the set of weapon position data and the base weapon position.

7. The method of claim 6, wherein the step of displaying a user view further comprises the steps of:
receiving a set of headset motion data;
receiving a set of weapon motion data;
calculating a headset orientation vector from the headset position and the set of headset motion data;
calculating a weapon orientation vector from the weapon position and the set of weapon motion data; and,
mapping the headset position, the headset orientation vector, the weapon position, and the weapon orientation vector to the simulation environment.

8. The method of claim 7, wherein the step of mapping further comprises the steps of:
converting the weapon position and the weapon orientation vector to a first set of coordinates;
rendering the virtual weapon in the simulation environment at the first set of coordinates;
converting the headset position and the headset orientation vector to a second set of coordinates;
defining a field of view of the simulation environment based on the second set of coordinates;
displaying the field of view as the user view;
comparing the first set of coordinates to the field of view; and,
displaying the virtual weapon at the first set of coordinates in the field of view if the first set of coordinates is in the field of view.

9. The method of claim 3, further comprising the steps of:
receiving a set of voice commands; and,
changing at least one of the group selected from the simulation environment, the target, the phantom image, the halo image and the virtual weapon, based on the set of voice commands.

10. The method of claim 3, wherein the step of determining the phantom hit condition further comprises the steps of:
comparing the shot string position to the phantom position; and,
generating the hit signal if the shot string position overlaps the phantom position.

11. The method of claim 3, further comprising the step of receiving a set of weapon data, and wherein the step of determining the halo hit condition further comprises the steps of:
determining a diameter for the halo image from the set of weapon data;
determining a halo position from the diameter and the phantom path;
comparing the shot string position to the halo position;
determining a halo overlap percentage between the halo position and the shot string position; and,
generating the hit signal if the halo overlap percentage is at least a predetermined percentage.

12. The method of claim 11, further comprising the step of generating a virtual weapon from the set of weapon data in the simulation environment.

13. The method of claim 3, wherein the step of generating a halo image further comprises the step of generating the halo image at a set of predetermined contrast levels.

14. A system for marksmanship training comprising:
a computer;
a headset connected to the computer;
a set of weapon sensors connected to the computer;
the computer programmed to:
receive a set of target data, a set of environment data, a selected simulation, and a set of weapon data;
generate a simulation environment from the set of environment data and the selected simulation;
generate a virtual weapon from the set of weapon data in the simulation environment;
generate a target along a target path from the set of target data in the simulation environment;
extrapolate a phantom path from the target path;
calculate a lead distance from the target path;
calculate a drop distance from the target path;
generate a halo and a phantom along the phantom path, at the lead distance, at the drop distance, in the simulation environment;
determine a headset position and a headset orientation;
determine a weapon position and a weapon orientation;
determine a user view of the simulation environment based on the headset position and the headset orientation;
send the user view to the headset;
receive a trigger pull signal from the set of weapon sensors;
determine a shot string position from the trigger pull signal, the set of weapon data, the weapon position, and the weapon orientation;
determine whether a hit is on the target based on the shot string position, the phantom, and the halo; and,
generate a hit signal if the hit is on the target.

15. The system of claim 14, wherein the computer is further programmed to set a base headset position, a base weapon position, a base headset orientation, and a base weapon orientation.

16. The system of claim 15, further comprising a set of hand sensors connected to the computer, and wherein the computer is further programmed to:
receive a set of hand position data from the set of hand sensors;
determine the weapon position from the set of hand position data and the base weapon position;
determine the weapon orientation from the set of hand position data and the base weapon orientation; and,
generate the trigger pull signal from the set of hand position data.

17. The system of claim 15, further comprising a set of position trackers connected to the computer, and wherein the computer is further programmed to:
receive a set of headset position data from the set of position trackers;
receive a set of weapon position data from the set of position trackers;
determine the headset position from the set of headset position data and the base headset position; and,
determine the weapon position from the set of weapon position data and the base weapon position.

18. The system of claim 17, wherein the headset further comprises a set of headset sensors, and wherein the computer is further programmed to:
receive a set of headset motion data from the set of headset sensors;
receive a set of weapon motion data from the set of weapon sensors;
calculate a headset orientation vector from the headset position and the set of headset motion data;
calculate a weapon orientation vector from the weapon position and the set of weapon motion data; and,
map the headset position, the headset orientation vector, the weapon position, and the weapon orientation vector to the simulation environment.

19. The system of claim 18, wherein the computer is further programmed to:
convert the weapon position and the weapon orientation vector to a first set of coordinates;
render the virtual weapon in the simulation environment at the first set of coordinates;
convert the headset position and the headset orientation vector to a second set of coordinates;
define a field of view of the simulation environment based on the second set of coordinates;
send the field of view as the user view to the headset;
compare the first set of coordinates to the field of view; and,
display the virtual weapon at the first set of coordinates in the field of view if the first set of coordinates is in the field of view.

20. The system of claim 14, further comprising a weapon removably attached to the set of weapon sensors.

21. The system of claim 14, further comprising a simulated weapon attached to the set of weapon sensors.

22. The system of claim 14, wherein the headset is a virtual reality headset.

23. The system of claim 14, further comprising a communication device connected to the computer, and wherein the computer is further programmed to:
- receive a set of voice commands; and,
- change at least one of the group selected from the simulation environment, the target, the phantom, the halo, and the virtual weapon, based on the set of voice commands.

24. The system of claim 14, wherein the computer is further programmed to:
- determine a phantom position from the phantom path;
- compare the shot string position to the phantom position; and,
- generate the hit signal if the shot string position overlaps the phantom path.

25. The system of claim 14, wherein the computer is further programmed to:
- determine a diameter for the halo from the set of weapon data;
- determine a halo position from the diameter and the phantom path;
- compare the shot string position to the halo position;
- determine a halo overlap percentage between the halo position and the shot string position; and,
- generate the hit signal if the halo overlap percentage is at least a predetermined percentage.

26. A system for teaching lead comprising:
- a network;
- a simulation administrator connected to the network;
- a database connected to the simulation administrator;
- a computer connected to the network;
- a set of weapon sensors connected to the computer;
- a set of position trackers connected to the computer;
- a virtual reality unit connected to the computer and configured to be wearable by a user;
- a marksmanship simulation, generated by the computer, further comprising a virtual target, a phantom target at a lead distance and a drop distance from the virtual target, and a halo surrounding the phantom;
- a user view of the marksmanship simulation, generated by the computer, displayed in the virtual reality unit;
- wherein the computer includes a memory and processor that are configured to perform the steps of:
  - receiving a set of target data and a set of environment data;
  - generating a simulation environment in the marksmanship simulation from the set of environment data;
  - generating the virtual target along a target path from the set of target data in the simulation environment;
  - extrapolating a phantom path from the target path;
  - calculating the lead distance from the target path;
  - calculating the drop distance from the target path;
  - calculating a phantom position of the phantom target along the phantom path at the lead distance and at the drop distance, in the simulation environment;
  - generating a phantom image of the phantom target at the phantom position;
  - determining a headset position of the virtual reality unit and a headset orientation of the virtual reality unit;
  - determining a weapon position and a weapon orientation;
  - generating the user view of the simulation environment based on the headset position and the headset orientation;
  - displaying the user view;
  - receiving a trigger pull signal;
  - determining a shot string position from the trigger pull signal, the weapon position, and the weapon orientation;
  - determining a phantom hit condition based on the shot string position and the phantom position; and,
  - generating a hit signal if the phantom hit condition is true.

27. The system of claim 26, wherein the virtual reality unit further comprises a set of sensors, connected to the computer, for generating motion information of the virtual reality unit that is tracked by the computer.

28. The system of claim 27, further comprising a set of position signals generated by the set of position trackers, and wherein the user view is defined based on the motion information and the set of position signals.

29. The system of claim 28, further comprising:
- a set of weapon signals generated by the set of weapon sensors;
- a virtual weapon generated by the computer from the set of weapon signals in the marksmanship simulation at the weapon position.

30. The system of claim 29, wherein the virtual weapon is displayed in the user view when the weapon position is within the user view.

31. The system of claim 26, further comprising a real weapon removably attached to the set of weapon sensors.

32. The system of claim 31, wherein the real weapon further comprises a rail, and wherein the set of weapon sensors is removably attached to the rail.

* * * * *